July 13, 1971 MASAYOSHI NOMA ET AL 3,592,605

AUTOMATIC ANALYZING DEVICE

Filed Dec. 22, 1969 25 Sheets-Sheet 2

July 13, 1971 MASAYOSHI NOMA ET AL 3,592,605

AUTOMATIC ANALYZING DEVICE

Filed Dec. 22, 1969 25 Sheets-Sheet 5

July 13, 1971 MASAYOSHI NOMA ET AL 3,592,605

AUTOMATIC ANALYZING DEVICE

Filed Dec. 22, 1969 25 Sheets-Sheet 12

AUTOMATIC ANALYZING DEVICE

Filed Dec. 22, 1969 25 Sheets-Sheet 15

July 13, 1971 MASAYOSHI NOMA ET AL 3,592,605

AUTOMATIC ANALYZING DEVICE

Filed Dec. 22, 1969 25 Sheets-Sheet 16

United States Patent Office 3,592,605
Patented July 13, 1971

3,592,605
AUTOMATIC ANALYZING DEVICE

Masayoshi Noma, Tadao Yamamoto, and Hiroshi Takekawa, Tokyo, Japan, assignors to Olympus Optical Company Limited, Tokyo, Japan Filed Dec. 22, 1969, Ser. No. 887,220
Claims priority, application Japan, Dec. 21, 1968, 43/93,500; Apr. 25, 1969, 44/31,683
Int. Cl. G01n *1/00, 1/14*
U.S. Cl. 23—259 11 Claims

ABSTRACT OF THE DISCLOSURE

A device for automatic chemical analysis, comprises a sample turret holding a plurality of samples in containers disposed along the periphery thereof. A reaction tank means suspends a plurality of U-shaped reaction tubes movable through the constant-temperature liquid in a thermostatic vessel, and a sample transferring means is provided for transferring each sample from the containers of the sample turret to a selected reaction tube in the reaction tank means, a measuring means is provided for measuring selected properties of the sample by sucking the sample from the U-shaped reaction tube after keeping it in the thermostatic vessel for a certain period.

This invention relates to a device for automatic chemical analysis, and more particularly, to an automatic analyzing device which is suitable for use in clinical analyses.

In hospitals and medical laboratories, a large number of various kinds of clinical analyses are carried out every day, which cover analytical measurement of protein, sugar, cholesterol, etc., in liquid samples, such as serum samples. If such routine clinical analyses are repeated many times by medically trained personnel, it is a waste of the invaluable human ability of "thinking." Furthermore, the manual analyses can never be free from human error. In other words, the accuracy and the reproducibility of the manual analyses are limited to a certain level. As a result, there is a growing need for a device for automatically carrying out clinical analyses.

In most clinical analyses, a certain amount of sample, such as serum sample, is collected and diluted by a suitable diluent or a suitable reagent. The mixture is agitated to produce a well-mixed test solution, which is kept at a certain temperature for a certain time for effecting specific chemical reaction. If it is necessary, an additional reagent is added to the test solution for completing the reactions. After a certain period of time, measurement is made on the thus treated test solution by a suitable measuring device, such as a colorimeter. In an automatic analyzing device, all the aforesaid processes are automatically effected, and due care should be taken not to cause any contamination of the flow system including the sample, reagents, and additives, which are successively injected in the analyzer.

For practical purposes, it is also important that an automatic analyzing device should be capable of providing accurate analysis by using only a very small quantity of the sample, while ensuring high reproducibility of the analysis.

Therefore, an object of the present invention is to provide an automatic analyzing device, comprising a sample table consisting of a sample turret being adapted to horizontally rotate about the center thereof by a certain angular displacement at a time, and a plurality of sample container holders disposed along a periphery of the sample turret, a reaction tank means consisting of a driving disk assembly including a vertically reciprocating disk being disposed in the proximity of said sample turret and making a vertical reciprocation in response to each angular displacement of said sample turret and a rotary disk being coaxially disposed underneath the vertically reciprocating disk and making a certain angular displacement about the center thereof in response to each vertical reciprocation of said reciprocating disk, through holes bored on said vertically reciprocating disk along ahe periphery thereof, a plurality of first holes being bored along a circle on said rotary disk in such manner that each first hole communicates airtightly with one of said through-holes of said vertically reciprocating disk when said vertically reciprocating disk is at lowermost position thereof, a plurality of second holes being bored along a circle on said rotary disk, each being operatively related to one of said first holes, a plurality of U-shaped reaction tubes, each having one end connected to one of said first holes and the opposite end connected to the corresponding one of said second holes, respectively, a cupped portion being formed at one end of each said U-shaped reaction tubes, and a thermostatic chamber receiving said U-shaped reaction tubes; a sample transferring means taking a sample at a time from one of sample containers located at said sample turret to deliver the sample to one of said cupped portions of said U-shaped reaction tubes, located at said rotary disk; a reagent supplier feeding a reagent to said U-shaped reaction tube which is thus loaded with the sample; and an analyzing means for analyzing and measuring the samples, each being placed in one of said U-shaped reaction tubes.

For a better understanding of the invention, reference is made to the accompanying drawings, in which.

Like parts and members are designated by like numerals and symbols throughout the drawings.

GENERAL DESCRIPTION

Figure 1:
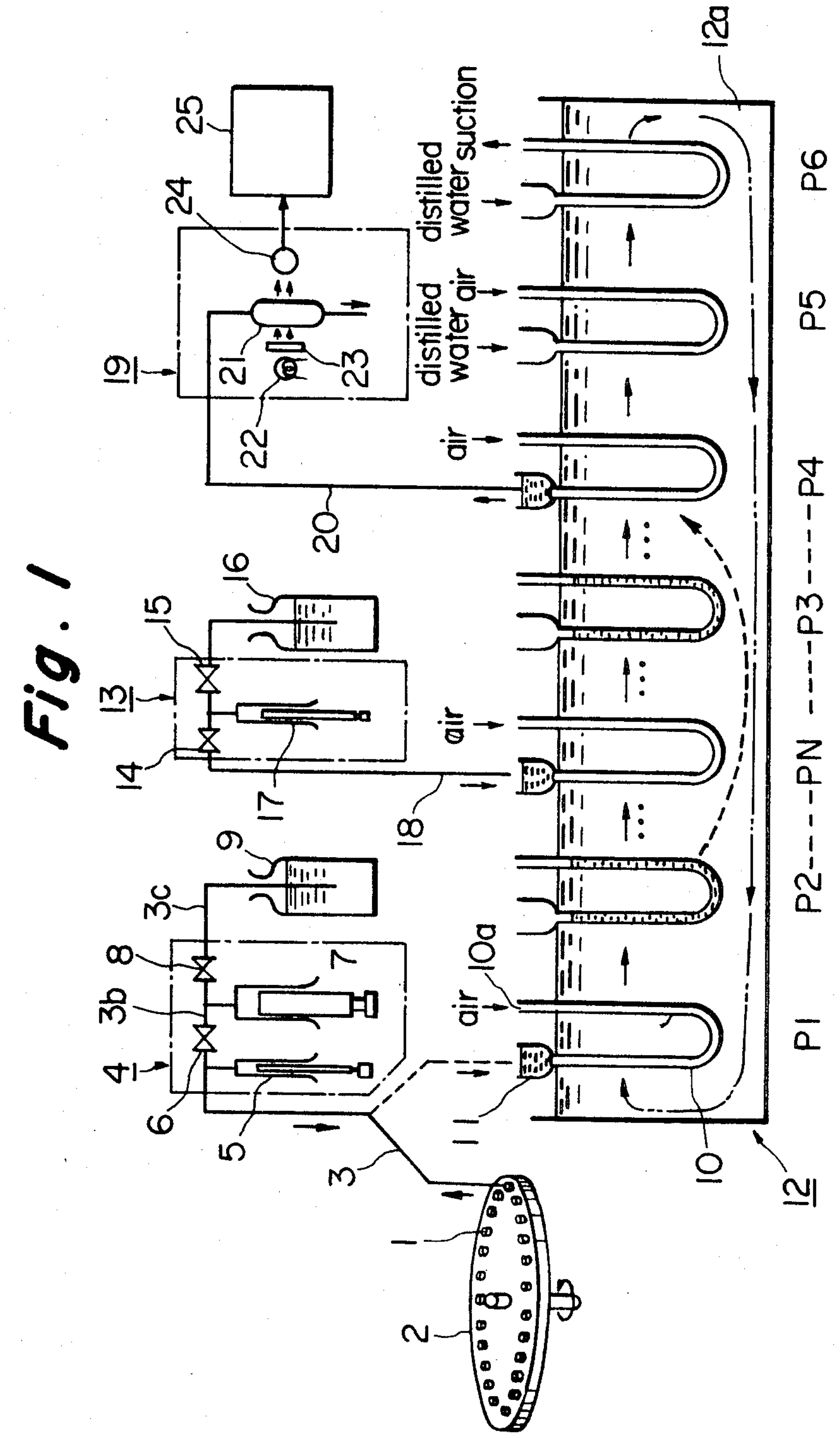
FIG. 1 is a flow diagram, illustrating an analyzing process through which an automatic analyzing device of the invention operates.
Figure 2:
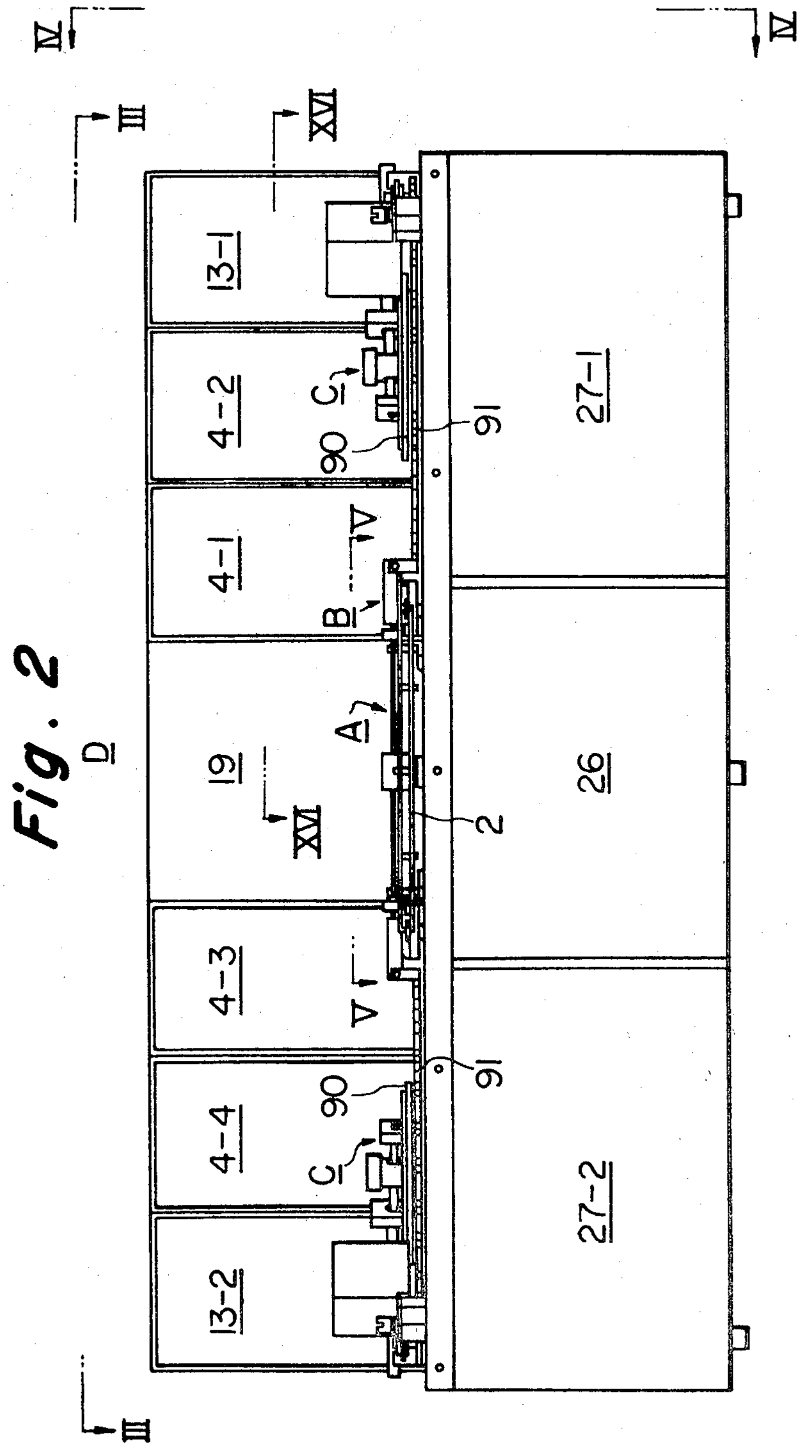
FIG. 2 is an elevation of an automatic analyzing device, according to the present invention, showing the overall construction thereof.
Figure 3:
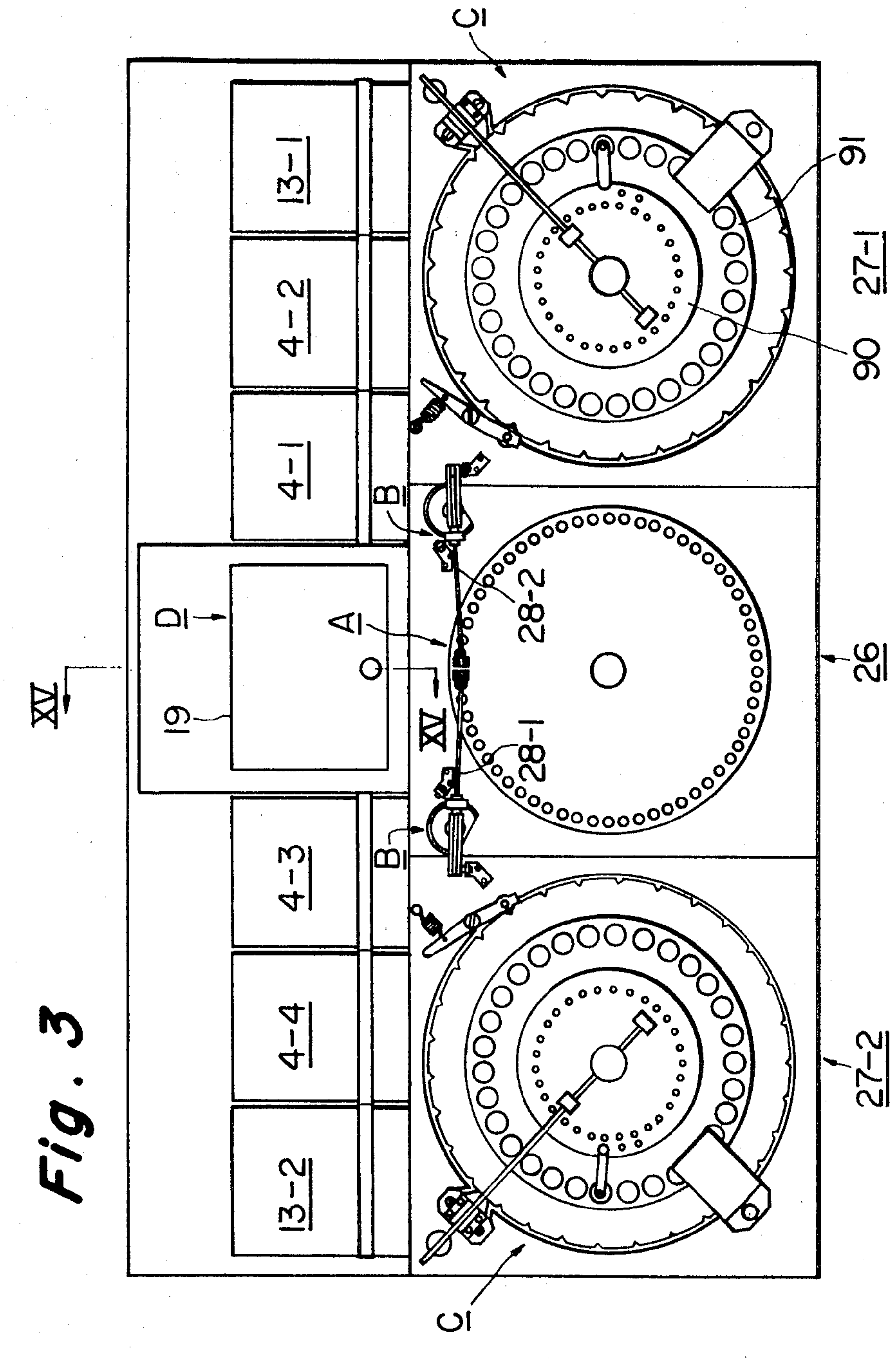
FIG. 3 is a plan view of the automatic analyzing device.
Figure 4:
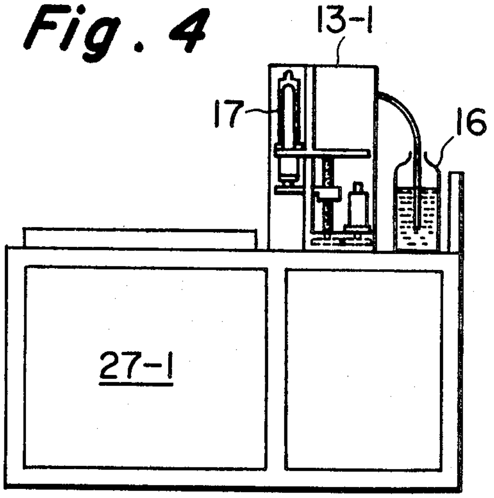
FIG. 4 is a side elevation; taken from the right-hand of FIG. 3.

FIG. 1 is a schematic illustration of a process which is to be sequentially followed by an automatic analyzing device according to the present invention. Samples, which are to be analyzed, such as serum for clinical analyses, are placed in sample containers 1, respectively, and a sample turret 2 holds such sample containers 1 along the periphery thereof. The sample container 1 can be, for instance, a test tube, and the sample turret 2 has a plurality of holes bored therethrough along its periphery, which act as the holders of the sample containers. Any desired number of sample containers can be handled by the sample turret. In a preferred embodiment of the invention, as illustrated in FIGS. 2 to 4, up to sixty such sample containers 1 are held by the sample turret 2.

The sample turret 2 is adapted to rotate intermittently by a certain angle at a time about the center thereof, which angle depends on the number of the sample containers 1 being handled by the sample turret. In the aforesaid embodiment, the angle of each step of rotation of the sample turret is 6(=360/60) degrees. When the sample turret 2 is at rest, one of the sample containers 1 comes, in turn, to a position directly underneath the tip of a flexible pipe 3 made of resilient material. As the sample container 1 reaches the aforesaid position under the tip of the pipe 3, the free end of the flexible pipe 3 descends to the sample container, until the tip of the pipe dips in the sample held by the container 1. At this moment, a syringe-like sucker 5 of diluting means 4 is actuated, for instance, by means of a magnetic actuator, so that a certain amount of the sample is sucked into the sucker 5 through the pipe 3. During this process, a valve 6 between two suckers 5 and 7 is kept as closed. Another valve 8 is then opened to allow the syringe-like sucker 7 to suck a desired amount of a reagent or a diluent from a reagent or diluent container 9, for instance, by energizing a magnetic actuator. This suction of the reagent into the sucker 7 can be done either before or simultaneously with the charging of the sucker 5 with the sample.

After the desired amount of the sample is sucked through the flexible pipe 3 and the required amount of the reagent or diluent is charged into the sucker 7, the free end of the flexible pipe 3 is raised, and turned rightwards, as seen in FIG. 1, until it comes above the cup 11 of a U-shaped reaction tube 10, as shown by dotted lines in the figure. The sample turret 2 is held stationary until the flexible pipe 3 is raised away from the sample container 1 held by the sample turret 2.

The sucker 5 is then so actuated as to discharge its content into the cup 11 of the reaction tube 10 through the pipe 3. At the same time, air is forced into the U-shaped reaction tube 10 from its non-cupped end 10*a*, so that the sample thus delivered into the cup 11 can be held in the cup 11 without moving down into the bent portion of the reaction tube 10, as shown at the position P1 of FIG. 1. Subsequently, the valve 6 is opened while closing the valve 8, so that the reagent in the sucker 7 can be delivered into the cup 11 through the pipe 3 by discharging the sucker 7. The stream of the reagent through the pipe 3, from the sucker 7 to the cup 11, collects deposits of the sample on the inner wall of the pipe 3, and delivers the sample deposits to the reaction tube 10. Thereby, the risk of contamination of the succeeding sample by such deposits of the current sample on the tube 3 can completely be eliminated.

It is possible to deliver the sample and the reagent at the same time, and such concurrent delivery enables better mixing of the sample and the reagent in the cup 11. In any case, the sample and the reagent are thoroughly mixed in the cup 11 of the U-shaped reaction tube 10, by means of air being forced therein from the opposite end 10*a* of the U-shaped reaction tube 10. When the air flow to the reaction tube 10 terminates, the test solution consisting of the sample and the reagent moves down to the bent lower portion of the U-shaped reaction tube 10. In this automatic analyzing device, the U-shaped reaction tubes 10 are held in a thermostatic vessel 12, which is filled with a suitable heating liquid 12*a*, so that the test solution in the reaction tube 10 is held at a certain constant temperature to effect prescribed chemical reactions.

As will be described hereinafter, the thermostatic vessel 12 is substantially circular in shape, and the reaction tubes 10 rotate intermittently in the thermostatic vessel 12 about the center thereof. The sample is delivered to the reaction tube 10, in the illustrated example, when the reaction tube 10 is at position P1. If it is desired to add a second reagent into the test solution at a certain stage of the chemical reaction in the individual reaction tube, a movable reagent feeder 13 can be provided in the automatic analyzing device, so that the second reagent can be added at a suitable angular position in the rotation of the reaction tube 10 corresponding to the desired stage of the chemical reaction. In FIG. 1, such position is represented by PN. With the reagent feeder thus provided, by properly operating valves 14, 15 and a sucker 17 in a manner similar to that of the diluting means 4, the desired amount of the second reagent in a bottle 16 can be delivered into the cup 11 of the U-shaped reaction tube 10 at the position PN. In a preferred embodiment of the invention, air is forced into the U-shaped reaction tube 10 during the delivery of the second reagent therein, so that the newly added second reagent can be thoroughly mixed with the test solution in the reaction tube 10. Upon termination of the air flow to the reaction tube 10, the mixture descends again into the lower bent portion of the U-shaped reaction tube 10.

As will be described in detail hereinafter, the opposing upper ends 10*a* and 11 of each U-shaped reaction tube 10 are secured to a rotary disk 91 (FIG. 12), while disposing the reaction tubes along radial directions emanating from the center of the rotary disk at uniform angular intervals. The rotary disk is disposed at the top of the circular thermostatic vessel and intermittently rotated by a certain angular displacement at a time. Accordingly, all the U-shaped reaction tubes 10, secured to the rotary disk 91, simultaneously rotate through the liquid 12*a* in the thermostatic vessel 12 by a certain angular displacement at a time. The intermittent rotation of the rotary disk 91 and the temperature of the liquid 12a in the thermostatic vessel 12 are so controlled that the test solution in the reaction tube 10 is kept at a proper temperature for a desired period of time.

After keeping the U-shaped reaction tube 10 in the vessel 12 for a prescribed period of time, for instance a period corresponding to the travel through positions P2 to P3 in FIG. 1, air is again forced into the U-shaped reaction tube for raising the test solution to the cup 11 of the tube 10. A pipe 20 of a measuring device, e.g., a colorimeter 19 in a preferred embodiment, is now dipped into the thus treated test solution in the cup 11, so as to suck the test solution into a flow-cell 21 of the colorimeter 19. The colorimeter includes a light source lamp 22 disposed to the left of the flow-cell 21, an interference filter 23 disposed between the light source lamp 22 and the flow-cell 21, and a photoelectric detector 24 disposed at the opposite side of the flow-cell 21. Electric output from the photoelectric detector 24 can automatically be recorded by a recorder 25.

Upon completion of the measurement, fresh or distilled water is forced into the U-shaped reaction tube 10, at position P5, through the cup 11 while sucking it from the opposite end for rinsing the reaction tube 10. After rinsing, the distilled water is removed from the reaction tube 10 at position P6. Thus, the reaction tube 10 is prevented from causing contamination of the succeeding sample to be treated by the reaction tube.

In the foregoing, the process of the automatic analysis to be effected by the device according to the present invention has been described by referring to one specific sample. The same process is continuously effected on succeeding samples in the automatic analyzing device. Two or more different analyses can be simultaneously effected on each sample by the device of the invention, if so desired. In order to carry out such simultaneous analyses, the sample in a specific sample container 1 is, for instance, delivered into two or more U-shaped reaction tubes 10, each being assigned to a different analytical process, respectively, by using two or more flexible pipes 3 in the same manner as described in the foregoing.

FIG. 2 is an elevation of an embodiment of the automatic analyzing device according to the present invention, showing the overall disposition thereof. FIGS. 3 and 4 are a plan view and a side elevation from the right-hand, respectively, of the device of FIG. 2. In the illustrated embodiment, a sample table A consisting of the sample turret 2 and the sample containers 1 is disposed at the central portion of the device, and a pair of reaction tank means C consisting of a driving disk assembly and a thermostatic vessel 12 for effecting chemical reactions between the sample and the reagent are provided, one on either side of the sample table A.

The sample turret 2 is mounted on the top of a central cabinet 26, which includes a motor 35 (FIG. 5) for intermittently actuating the sample turret 2, a transmission for delivering the output power from the motor 35 to the sample turret 2, and a plurality of cam means for actuating various parts of the analyzing device in proper sequence. A plurality of sample containers 1 are held by the sample turret 2 along the periphery thereof. As pointed out in the foregoing, sixty sample containers 1 are held by the sample turret 2, in the illustrated embodiment.

The two reaction tank means C are housed in a pair of side cabinets 27–1 and 27–2, one on either side of the central cabinet 26. A measuring means D consisting of the colorimeter 19 is disposed at the back of the central cabinet 26. Four diluting means 4–1, 4–2, 4–3, and 4–4 are provided, two on either side of the colorimeter. A pair of reagent feeders 13–1 and 13–2 are mounted on the analyzing device at the opposing ends of the device, adjacent to the outer ones of the diluting means.

A pair of sample transferring means B are provided on the top of the central cabinet between the sample table A and each of the reaction tank means C, respectively, for transferring the sample from the sample container 1 of the sample table A to the U-shaped reaction tube 10 of the reaction tank means C. Two such sample transferring means B are provided, because a pair of reaction tank means C are used. The two sample transferring means B have arms 28–1 and 28–2, respectively, which can vertically swing about pins and horizontally swing about shafts supporting the arms, respectively.

Figure 5:
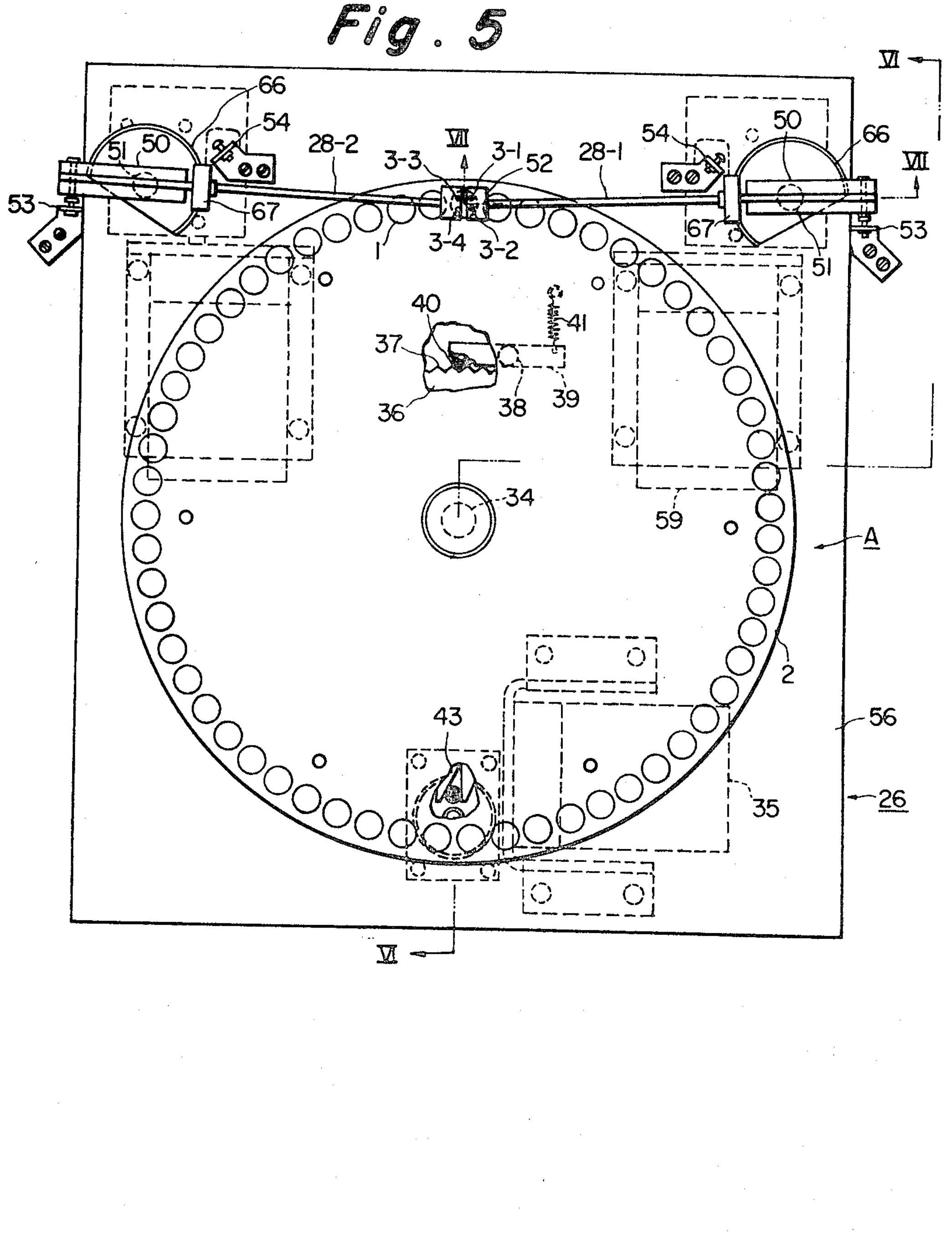
FIG. 5 is a plan view, illustrating details of a sample turret and a sample transferring means.

Referring to FIG. 5, each arm 28–1, or 28–2, holds a pair of flexible pipes 3–1, 3–2; or 3–3, 3–4. Fixed ends of the four flexible pipes are connected to the four diluting means 4–1, 4–2, 4–3, and 4–4, respectively. In the following description of the operation of the automatic analyzing device, it is assumed that the sample in one sample container 1 at the sample table A is transferred to only one reaction tube 10 in the reaction tank means C. With the illustrated construction of the device, however, it is possible to deliver simultaneously each sample into two reaction tubes 10 through the pipes 3–1, 3–2; or 3–3, 3–4. Furthermore, by slightly modifying the construction, the automatic analyzing device of the invention can simultaneously transfer each sample to any number of different reaction tubes 10 for simultaneously carrying out the same number of different analyses on each sample.

Sample table, A

Figure 6:
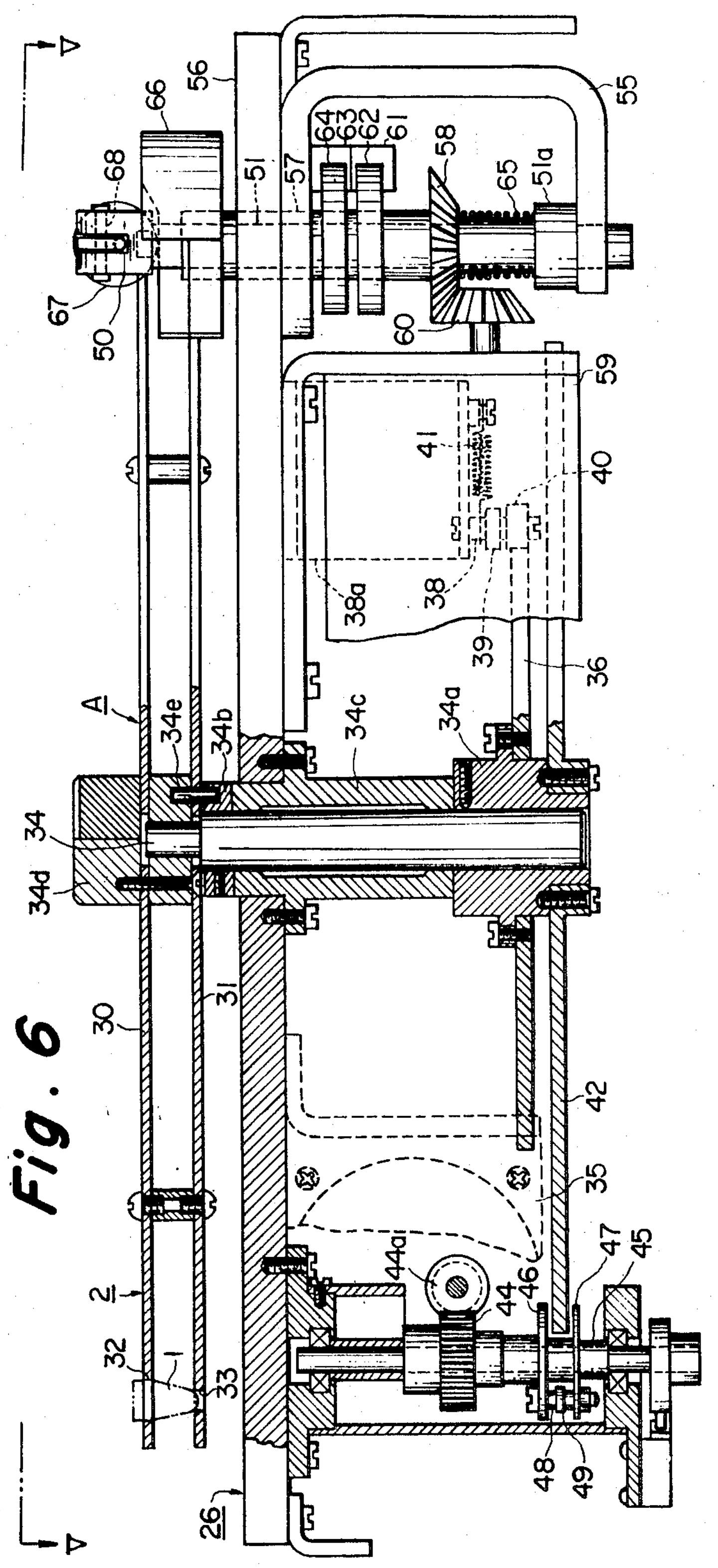
FIG. 6 is a sectional view, taken along the line VI—VI of FIG. 5.

FIGS. 5 and 6 illustrate details of the sample table A consisting of the sample turret 2 and the sample transferring means B. The sample turrent 2 consists of a pair of discs, a lower disk 31 and an upper disk 30, with a suitable spacing therebetween. A plurality of holes 33, e.g., sixty holes, are bored along the periphery of the lower disk 31, and corresponding holes 32 are bored on the upper disk 30 in alignment with the holes 33 of the lower disk 31. The size of each hole 32 of the upper disk 30 is such that a sample container 1 can be inserted therethrough and supported by the peripheral surface of the hole 32, as shown in FIG. 6. The hole 33 of the lower disk 31 is comparatively small and cooperates with the corresponding one of the holes 32 of the upper disk 30 for securely holding each sample container 1 in position. The hole 33 of the lower disk 31 is not restricted to through holes, but it can be a recess capable of holding the bottom of the sample container 1 in position.

The sample turret 2 is assembled by integrally connecting the two disks 30 and 31 to a cap 34d by screws. The sample turret 2 is then operatively connected to a driving shaft 34 by a suitable means, such as pins 34e, in a replaceable manner. The driving shaft 34 is rotated by a driving motor 35 through a suitable transmission, as will be described hereinafter.

A bearing 34c is integrally secured to a top board 56 of the central cabinet 26, so as to rotatably suppport the driving shaft 34. A flange 34b is integrally secured to the upper end of the shaft 34 and slidably supported by the bearing 34c, so as to bear the thrust force acting on the driving shaft 34. Another flange 34a is integrally secured to the lower end of the driving shaft 34, which flange 34a in turn holds an indexing disk 36 and a driving disk 42.

In order to index the operative angular position of the sample turret 2, the indexing disk 36 is integrally secured to the driving shaft 34 through the flange 34a by means of bolts. A plurality of V-notches 37 are formed on the periphery of the indexing disk 36 at angular positions corresponding to the holes 32, 33 of the sample turret 2, with respect to the axis of the driving shaft 34. In this embodiment, sixty such V-notches 37 are provided. An indexing lever 39 is pivotally supported by a pin 38 which is secured to a bracket 38a (FIG. 6) integrally secured to the top board 56 of the central cabinet 26. A roll 40 is rotatably connected to the left end of the indexing lever 39, as seen in FIG. 5, while a coiled spring 41 is inserted between the right end of the indexing lever 39 and the fixed bracket 38a, so that the indexing lever 39 is biased in a counter-clockwise direction, as seen in the figure. Thus, the roll 40 is forced to engage one of the V-notches 37 formed on the periphery of the indexing disk 36. Thus, the operative angular position of the sample turret 2 is indexed by the engagement of the roll 40 with one of the V-notches 37.

A driving disk 42 is integrally secured to the lower end of the driving shaft 34 by means of the flange 34*a* and bolts. Teeth 43 are formed on the periphery of the driving disk 42 at angular positions corresponding to the holes 32, 33 of the sample turret 2, of which one is shown in FIG. 5. In the illustrated embodiment, sixty such teeth 43 are formed on the periphery of the driving disk 42. A transmission shaft 45, which is rotatably supported by the top plate 56 of the central cabinet 26, is driven by a driving motor 35 through operative engagement between a worm 44*a* secured to the shaft of the motor 35 and the cooperating worm wheel 44 secured to the transmission shaft 45. Since the details of the driving motor and bearing means of the transmission are known to those skilled in the art, the above description will be sufficient for understanding the invention. A pair of spaced small disks 46 and 47 are coaxially secured to the transmission shaft 45, in such manner that the periphery of the driving disk 45 fits in the space between the small disks 46 and 47. A pin 48 is inserted between the two small disks 46, 47 in parallel with the transmission shaft 45. A roll 49 is rotatably mounted on the pin 48. The position of the pin 48 relative to the driving shaft 45 and the driving disk 42 is such that as the driving shaft 45 makes one revolution, the engagement of the roll 49 with one of the teeth 43 of the driving disk 42 causes the driving disk 42 to turn by one pitch, or 6 degrees (=360/60), about the axis of the driving shaft 34. As a result, the driving shaft 34 and the sample turret 2 rotate by one step, or 6 degrees, together with the driving disk 42, due to the integral connection among the driving disk 42, the driving shaft 34, and the sample turret 2. When the driving shaft 34 makes the aforesaid rotation, the indexing disk 36 also turns together with the driving shaft 34, while overcoming the biasing force of the coiled spring 41, and the succeeding angular position of the sample turret 2 is indexed by the engagement of the roll 40 of the indexing lever 39 with the succeeding V-notch 37 of the indexing disk 36.

Sample transferring means, B

A pair of sample transferring means B are mounted on the central cabinet 26, as shown in FIG. 5. The two sample transferring means B are identical with each other except that the rotating directions of arms are opposite to each other in swaying from the sample table A to the reaction tank means C. For simplicity's sake, the construction of one of the sample transferring means B, which is to the right of the sample turret 2 in FIG. 2, will be described in detail, referring to FIGS. 5, 7, 8 and 16.

The sample transferring means B generally consists of a horizontally swingable arm 28–1 and a vertical rotary shaft 51, whose top pivotally supports the arm 28–1. A head 52 is mounted at the tip of the arm 28–1, and two holes are bored through the head 52, so as to receive one end of two flexible pipes 3–1 and 3–2, respectively. The opposite ends of the two pipes 3 are connected to the diluting means 4–1 and 4–2, respectively.

Figure 16:
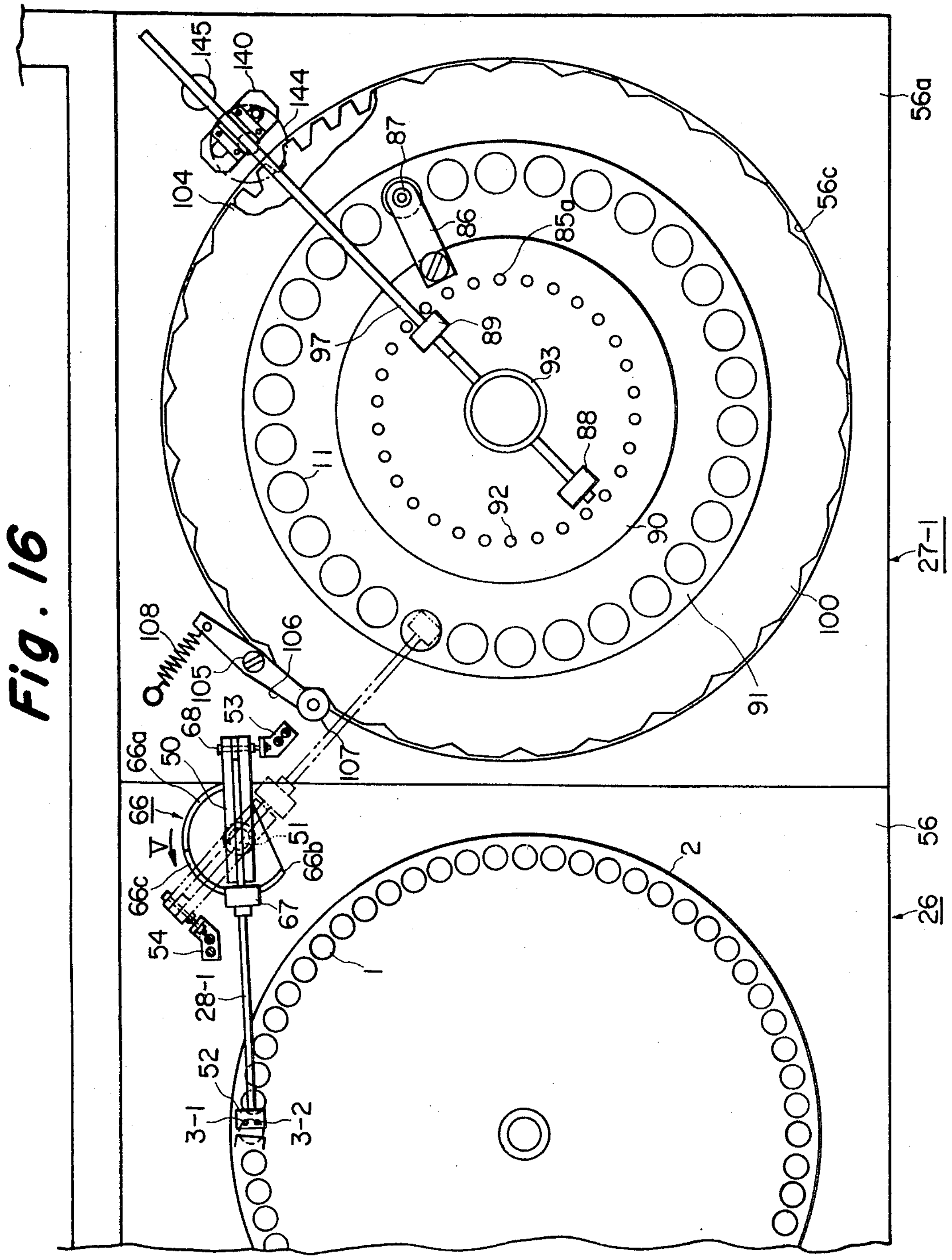
FIG. 16 is an enlarged plan view, illustrating operative relations between a reaction tank means and a sample table consisting of the sample turret.

FIG. 16 illustrates, on an enlarged scale, the relative disposition of the sample turret 2, a rotary disk 91, and the swingable arm 28–1. As described in the foregoing, the sample turret 2 turns intermittently about the center thereof by one pitch, e.g., 6 degrees, at a time, which pitch corresponds to an angular displacement between adjacent sample containers 1. The rotary disk 91 has a plurality of reaction tubes 10, e.g., thirty reaction tubes, and turns intermittently by one pitch at a time, which pitch corresponds to an angular displacement between adjacent cups 11 of the adjacent reaction tubes 10. In the illustrated embodiment, one pitch of the rotary disk 91 is 12 degrees (=360/30). As shown in FIGS. 5 and 16, a pair of stoppers 53, 54 are mounted on the top boards 56 and 56*a* of the central cabinet 26 and the side cabinet 27–1 for each swingable arm 28–1, so as to limit the swinging movement of the arm 28–1.

Figure 7:
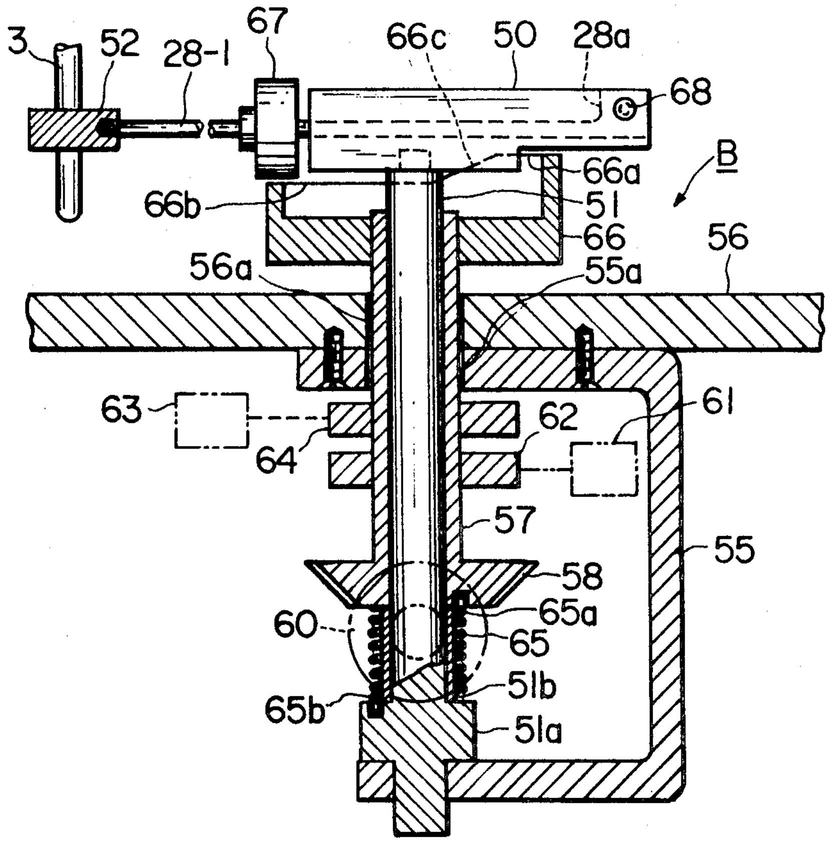
FIG. 7 is a vertical sectional view of a sample transferring means, illustrating details of a shaft which drives a swingable arm thereof.
Figure 8:
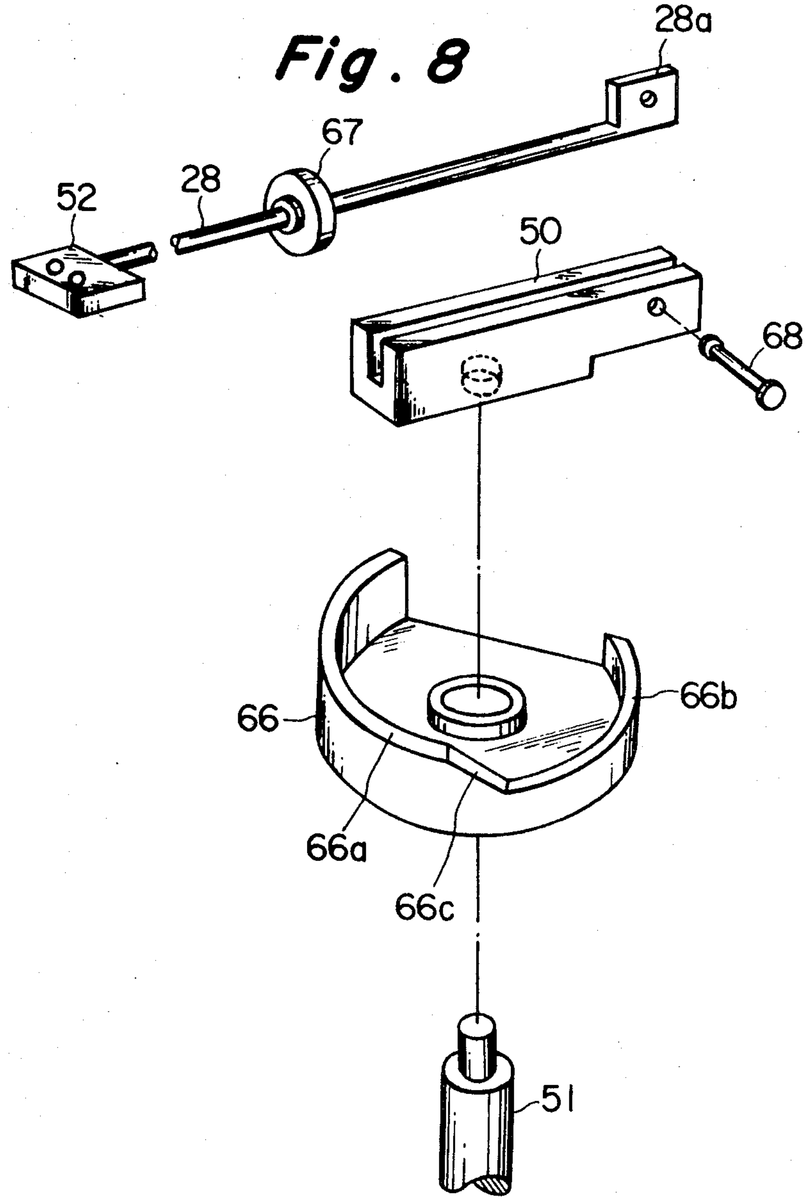
FIG. 8 is an exploded perspective view, illustrating construction of the swingable arm, the driving shaft, and a cam.

Referring to FIGS. 7 and 8, an arm holder 50 is integrally secured to the top of the shaft 51 for turning the arm 28–1. An enlarged end portion 28*a* of the arm 28–1 is pivotally connected to the arm holder 50 by a pin 68, so that the swingable arm 28–1 can swing about the pin 68 in a vertical plane passing the axis of the shaft 51. The swingable arm 28–1 can, of course, swing horizontally about the axis of the shaft 51 together with the shaft 51. In order to rotatably hold the shaft 51, a bracket 55 is integrally secured to the top board 56 of the central cabinet 26, by a suitable securing means, e.g., bolts. A flange 51*a* is integrally formed with the shaft 51 and slidably engages the bracket 55, so as to bear the thrust force acting on the shaft 51 by the engagement between the bracket 55 and the flange 51*a* of the shaft 51.

A sleeve 57 is mounted on the shaft 51 with a space from the flange 51*a*, so as to rotate relative to the shaft 51. The upper end of the sleeve 57 slidably and rotatably penetrates through a hole 55*a* of the bracket 55 and a hole 56*a* of the top board of the central cabinet 26. The sleeve 57 has a gear 58 integrally formed at the lower end thereof, which meshes a pinion 60 secured to the output shaft of a reversible motor 59, as shown in FIG. 7. The reversible motor 59 is secured to the side wall of the central cabinet 26 by a suitable means, e.g., bolts. A spacer tube 51*b* is inserted between the lower end of the sleeve 57 and the flange 51*a* of the shaft 51, so as to ensure the minimum spacing therebetween.

A pair of limit switches 61 and 63 are mounted on the side walls of the central cabinet 26 by suitable means (not shown), and a pair of cams 62 and 64 are coaxially secured to the sleeve 57, so as to selectively actuate the limit switches 61 and 63, respectively. The limit switch 61 is connected to such a control circuit that when the swingable arm 28–1 comes to a sample sucking position (as shown by solid lines in FIG. 16), with the head 52 located in the proximity of a selected sample container 1 and lowered thereto, the reversible motor 59 is de-energized to stop the rotation in one direction. The connection of the limit switch 63 is such that when the swingable arm 28–1 comes to a sample discharging position (as shown by double dot-dash lines in FIG. 16), the rotation of the motor 59 in the opposite direction is stopped again. Electric circuitry for effecting such control of the reversible motor 59 is well known to those skilled in the art, and accordingly, the details of the circuitry will not be described here.

According to a feature of the present invention, a coiled spring 65 is inserted between the gear 58 of the sleeve 57 and the flange 51*a* of the shaft 51, so as to surround the spacer tube 51*b*. Upper end 65*a* and lower end 65*b* of the coiled spring 65 are fitted in recesses bored on the lower surface of the gear 58 and the upper surface of the flange 51*a*, respectively. The coiled spring 65 cooperates with a cam 66 to be described hereinafter.

Referring to FIG. 8, a cam 66 with a vertically extending cam surface is integrally secured to the top of the sleeve 57, so as to rotate together with the sleeve 57 in response to the rotation of the reversible motor 59. The vertically extending cam surface of the cam 66 includes a heightened portion 66*a*, a lower portion 66*b* and a sloped intermediate portion 66*c*. A disk-shaped cam follower 67 is mounted on the swingable arm 28–1 at such position that the cam follower 67 may be kept in contact with one of the cam surfaces 66*a*, 66*b*, and 66*c* of the cam 66. Thus, as the sleeve 57 rotates relative to the shaft 51, in response to the rotation of the reversible motor 59, the contact between the cam follower 67 and the cam 66 causes the arm 28–1 to swing vertically about the pin 68, so that the head 52 secured to the tip of the arm 28–1 can move toward or away from the top board 56 of the central cabinet 26.

The disposition of the coiled spring 65 is such that when the spring 65 is at the neutral position, or when the spring 65 is not twisted relative to the axis of the shaft 51, the spring 65 tends to bring the sleeve 57 to that angular position where the cam follower 67 of the swingable arm 28–1 rests on the heightened portion **66*a* of the cam surface of the cam 66, so as to normally keep the swingable arm 28–1** at the raised position.

The operation of the sample transferring means B of the aforesaid construction will now be described. When the swingable arm 28–1 is at the position as shown by solid lines in FIG. 16, the sample transferring means B is at the sample sucking position. The tips of the flexible pipes 3–1 and 3–2 are dipped in the selected one of the sample containers 1, and the sample in the container can be sucked into the diluting means 4–1 and 4–2, through the pipes 3–1 and 3–2 thus held by the arm 28. In the following description, however, it is assumed that only one of the diluting means is charged.

At this sample sucking position of the sample transferring means B, the arm 28–1 is at the lowered position. Accordingly, the coiled spring 65, as shown in FIG. 7, is twisted from its neutral position, and elastic energy is stored therein, because when the coiled spring 65 is at its neutral position, the arm 28 should be at the raised position, as described in the foregoing.

Now, upon completion of the sample sucking operation, the reversible motor 59 is actuated by a suitable switch means (not shown), such as a microswitch sensitive to the liquid level in the sucker 5 of FIG. 1, so as to turn the cam 66 in a direction as shown by the arrow V of FIG. 16, through the pinion 60, the gear 58 and the sleeve 57. The circuit for starting the reversible motor 59 upon completion of the sucking operation is apparent to those skilled in the art and not shown here. As the cam 66 begins to rotate in the direction as shown by the arrow V, the heightened portion **66*a* of the cam 66 approaches toward the cam follower 67. In other words, the cam 66 moves in a direction to bring the spring 65 to the neutral position. Thus, in the beginning of the rotation of the cam 66 and the sleeve 57, the energy stored in the spring 65 is released by returning to the neutral position, and the spring 65 does not transmit the rotation of the sleeve 57 to the shaft 51. As a result, during the beginning of the rotation of the cam 66 from the position as shown in FIG. 16, the shaft 51 and the arm 28–1 do not rotate about the axis of the shaft 51, but the arm 28–1 turns vertically about the pin 68 to bring the head 52 upwards as the cam follower 67 is raised by the intermediate portion 66*c* and the heightened portion 66*a* of the cam 66. During this vertical swing of the arm 28–1, one end of the arm holder 58 is kept in contact with the stopper 53. Consequently, the tips of the flexible pipes 3–1 and 3–2 are removed from the sample container 1**.

By the time when the head 52 of the arm 28–1 comes to its uppermost position, the energy stored in the spring 65 is almost completely released and the spring 65 comes to the neutral position. As the reversible motor 59 further rotates to turn the sleeve 57 through the gears 60 and 58, the spring 65 transmits the rotation of the sleeve 57 to the shaft 51. Accordingly, the shaft 51 and the arm 28–1 turn about the axis of the shaft 51, together with the cam 66. Thus, the arm 28–1 moves to the position (test solution discharging position, as shown by double dot-dash lines in FIG. 16, while keeping the head 52 as raised with the cam follower 67 in contact with the heightened portion **66*a* of the cam 66**.

When the arm 28–1 reaches the test solution discharging position, the arm holder 50 comes in contact with the stopper 54, while the sleeve 57 actuates the limit switch 63 by the cam 64. Thus, the reversible motor 59 stops. At this moment, the head 52 is positioned immediately above the cup 11 of the reaction tube 10 which corresponds to the sample container 1 whose content has just been sucked into the corresponding diluting means, e.g., 4–1. The sample and the reagent in the diluting means 4–1 are now delivered into the corresponding cup 11 through the pipe 3–1, either simultaneously or successively. If the other diluting means 4–2 has been charged with the same sample through the pipe 3–2, the content of the diluting means 4–2 is also discharged through the pipe 3–2 into the corresponding cup 11, which is generally different from the preceding cup 11 corresponding to the pipe 3–1. The mechanism for shifting the head 52 from the first cup 11 corresponding to the pipe 3–1 to the second cup 11 corresponding to the pipe 3–2 is apparent to those skilled in the art, and details of such mechanism will not be described here.

Upon completion of the discharging of the sample and the reagent from the diluting means 4–1 and 4–2 into the cups 11, the reversible motor 59 is energized in the reverse direction by a suitable switch means (not shown), such as a microswitch sensitive to the liquid level in the sucker 5 of FIG. 1. Since the spring 65 is at the neutral position when the arm 28–1 is at the test solution discharging position, the rotation of the sleeve 57, which is in response to the reverse rotation of the motor 59, is transmitted to the shaft 51 through the spring 65. Accordingly, the sleeve 57 and the shaft 51 cause the cam 66 and the arm 28–1 to rotate horizontally about the axis of the shaft 51 in a direction opposite to the arrow V of the FIG. 16, until the arm 28–1 comes to the sample sucking position, as shown by solid lines in FIG. 16, where the arm 28–1 is stopped by the stopper 53. During such reverse rotation of the arm 28–1, the head 52 is kept at the raised position by means of the engagement between the cam follower 67 and the heightened portion **66*a* of the cam 66**.

The position where the arm 28–1 stops can be controlled by adjusting the stoppers 53, 54.

Control circuit of the reversible motor 59 is such that the motor 59 continues the reverse rotation even after the arm 28–1 is arrested by the stopper 53. With the arm 28–1 thus arrested by the stopper 53, the reverse rotation of the reversible motor 59 causes the cam 66 to rotate relative to the shaft 51 in a direction opposite to the arrow V of FIG. 16, through the gears 60, 58 and the sleeve 57. During such movement of the cam 66, the shaft 51 is held stationary by the engagement between the arm-holder 50 and the stopper 53. Accordingly, the flange **51*a* of the shaft 51 is also kept stationary. Thus, the spring 65 is twisted away from the neutral position, by the rotation of the gear 58 holding one end 65*a* of the spring 65 relative to the flange 51*a* holding the opposite end 65*b* of the spring 65. At the same time, the reverse rotation of the cam 66 relative to the cam follower 67, which is now held stationary together with the arm 28–1, causes the arm 28–1 to swing down about the pin 68 as the sloped intermediate portion 66*c* and the lowered portion 66*b* of the cam 66 successively come in contact with the cam follower 67. As a result, the tips of the pipes 3–1 and 3–2 secured to the head 52 come into the sample held in a succeeding sample container 1, which is now brought to the sample sucking position by the rotation of the motor 35** and the related gears and disk (FIGS. 5 and 6).

Circuitry for synchronizing the swinging movement of the arm 28–1 and the rotation of the sample turret 2 is apparent to those skilled in the art and does not constitute the subject matter of the present invention, and the details of such synchronizing circuitry will not be described here.

As soon as the tips of the pipes 3–1 and 3–2 held by the head 52 are dipped into the sample in the sample container 1, the limit switch 61 is actuated by the cam 62 to stop the reverse rotation of the motor 59.

Thus, the sample transferring means B becomes ready for the succeeding sample sucking operation. As the sucking is completed, the motor 59 is started in the aforesaid manner, and sample transferring means B repeats the aforesaid transferring cycle.

In the illustrated embodiment, a head 52 is used to hold two flexible pipes 3–1 and 3–2, but the present invention is not restricted to such arrangement of the flexible pipes 3. For instance, the arm 28–1 can be made of one or more pipes, so as to suck and discharge the sample through the arm 28–1.

Figure 25:
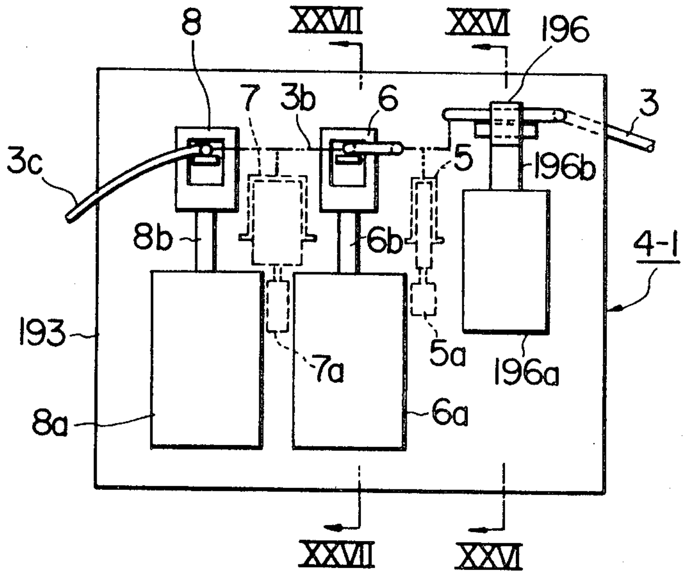
FIGS. 25 to 28B are diagrammatic illustrations of a diluting means of samples and valves controlling the flow of liquid in the diluting means, together with a drip-preventing means.

FIG. 25 is a schematic illustration of the diluting means 4–1, which is connected to a flexible pipe 3, which represents the pipe 3–1 or 3–2 of FIG. 5. The view shown in the figure is the back side of a front panel 193 of the diluting means. Referring to FIG. 1, together with FIG. 25, the stationary end of the flexible pipe 3, which is opposite to the free end held by the head 52 at the tip of the swingable arm 28–1, is secured to the panel 193 and connected to the sucker 5 through a drip-preventer 196. The drip-preventer 196 prevents dripping of liquid from the tip of the pipe 3 when the free end of the pipe 3 moves from the sample table A to the reaction tank means C in response to the movement of the swingable arm 28–1 of the sample transferring means B, as will be described hereinafter.

From the sucker 5, the pipe 3 extends to the second sucker 7 for reagent, through the valve 6, as shown by the symbol **3*b* in FIG. 25. The second sucker 7 is connected to the reagent bottle 9 (FIG. 1) through the valve 8, by means of the pipe 3*c***.

Figure 27:
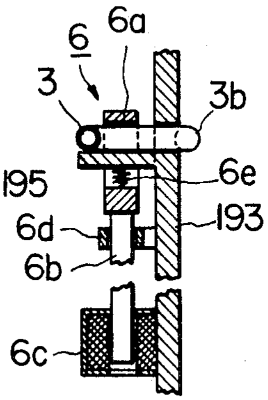

In the illustrated embodiment, all the valves and the suckers are shown as solenoid-operated units, but the present invention is not restricted to such solenoid-operated units and can comprise any other type valves, e.g., pneumatic valves. FIG. 27 illustrates the construction of the solenoid-operated valve 6, which is substantially the same as that of the valve 8. A bracket 195 is secured at the back of the front panel 193, so as to hold the pipe 3 thereon. The valve 6 consists of a square rectangular frame **6*a* having a rectangular opening through which the bracket 195 and the flexible pipe 3 penetrate. The rectangular frame 6*a* has a rod 6*b* being made of ferromagnetic substance and being integrally secured to the lower end of the frame 6*a*. The rod 6*b* is guided by a stationary guide member 6*d*, and moves downwards upon energization of a solenoid 6*c* which is secured to the panel 193 and surrounds the lower end of the rod 6*b* so as to pull the rod 6*b* upon actuation thereof. In order to normally bias the rectangular frame 6*a* upwards, an expansion spring 6*e* is inserted between the bracket 195 and the lower inner surface of the frame 6*a*. Thus, as long as the solenoid 6*c* is de-energized, the rectangular frame 6*a* is held as raised and the liquid can flow through the pipe 3 and 3*b***.

Upon actuation of the solenoid **6*c*, however, the rod 6*b* and the rectangular frame 6*a* are pulled downwards against the elasticity of the expansion spring 6*e*. As a result, the upper edge of the rectangular frame 6*a* and the bracket 195 pinches the pipe 3, so as to block the liquid flow therethrough. In effect, the valve 6 is closed to interrupt the liquid flow through the pipe 3, upon energization of the solenoid 6*c***.

In the automatic analyzing device of the invention, there is a possibility of dripping of the sample and the reagent from the tip of the flexible pipe 3 as the swingable arm 28–1 travels from the sample table A to the reaction tank means C. Such dripping of the liquid not only spoils the surface of the automatic analyzing device, but also causes measurement error by contaminating the succeeding sample or reagent at the sample table A or the reaction tank means C.

Figure 26:
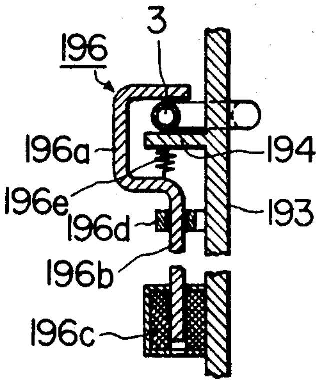

In order to eliminate such dripping from the tip of the flexible pipe 3, the drip-preventer 196 is incorporated in a preferred embodiment of the invention. Referring to FIGS. 25 and 26, the drip-preventer 196 comprises a bracket 194 integrally formed with the panel 193, on which the pipe 3 rests. A movable iron piece **196*a* has a pinching portion lying above the pipe 3 on the bracket 194, and an expansion spring 196*e* is inserted between the bracket 194 and the movable iron piece 196*a* so as to normally keep the aforesaid pinching portion of the movable iron piece 196*a* away from the pipe 3. The lower portion of the movable iron piece 196*a* is in the form of a leg 196*b*, which can be pulled downwards by a solenoid 196*c* along a stationary guide member 196*d***.

Figure 28A:
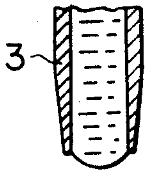
Figure 28B:
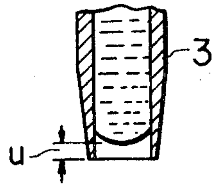

Referring to FIG. 28A, when the sample transferring means B has completed its sucking of the sample to the diluting means or delivery of the test solution, consisting of the sample and the reagent to the reaction tank means C, the tip of the flexible pipe 3 is filled with liquid. In operation, prior to the swing of the arm 28–1 of the sample transferring means B, from the sample table A to the reaction tank means C or from the reaction tank means C to the sample table A, the solenoid **196*c* is once energized and then de-energized, wherby, a very small amount of the liquid, for instance, a drop of the liquid, is forced to drip from the tip of the pipe 3, in response to the energization of the solenoid 196*c* which causes the pinching portion of the movable iron piece 196*a* to squeeze the pipe 3 on the bracket 194 against the expansion spring 196*e*. The succeeding de-energization of the solenoid 196*c* causes the liquid in the tip of the pipe 3 to come up by a distance $u$, as shown in FIG. 28B, by raising the movable iron piece 196*a* to allow the pipe 3 on the bracket 194** to restore its normal shape by the resiliency of the pipe itself.

Thus, it is apparent to those skilled in the art that with such tip of the pipe 3 having a short liquid-free portion, e.g., an air column of length $u$, drip-free swinging of the free end of the pipe 3 is possible in response to the swing of the arm 28–1 or 28–2 of the sample transferring means B.

Reaction tank means, C

Reaction tank means C, which receives test solution consisting of the sample and the reagent from the diluting means 4–1 to 4–4, as well as the reagent feeders 13–1 and 13–2, for effecting the prescribed chemical reaction on the test solution at a constant temperature while agitating it, will now be described in detail, referring to FIGS. 9 to 18. The illustrated embodiment of the invention includes a pair of reaction tank means C disposed in the side cabinets 27–1 and 27–2, respectively, as shown in FIGS. 1 and 2. Since the construction and the operation of the two reaction tank means C are identical with each other, description will be made on one of them, i.e., the reaction tank means C disposed in the side cabinet 27–1.

The reaction tank means C comprises three major elements; namely, a vertically reciprocating disk 90, a rotary disk 91 equipped with a plurality of U-shaped reaction tubes 10, and a thermostatic vessel 12 holding heating liquid **12*a*** therein.

Figure 9:
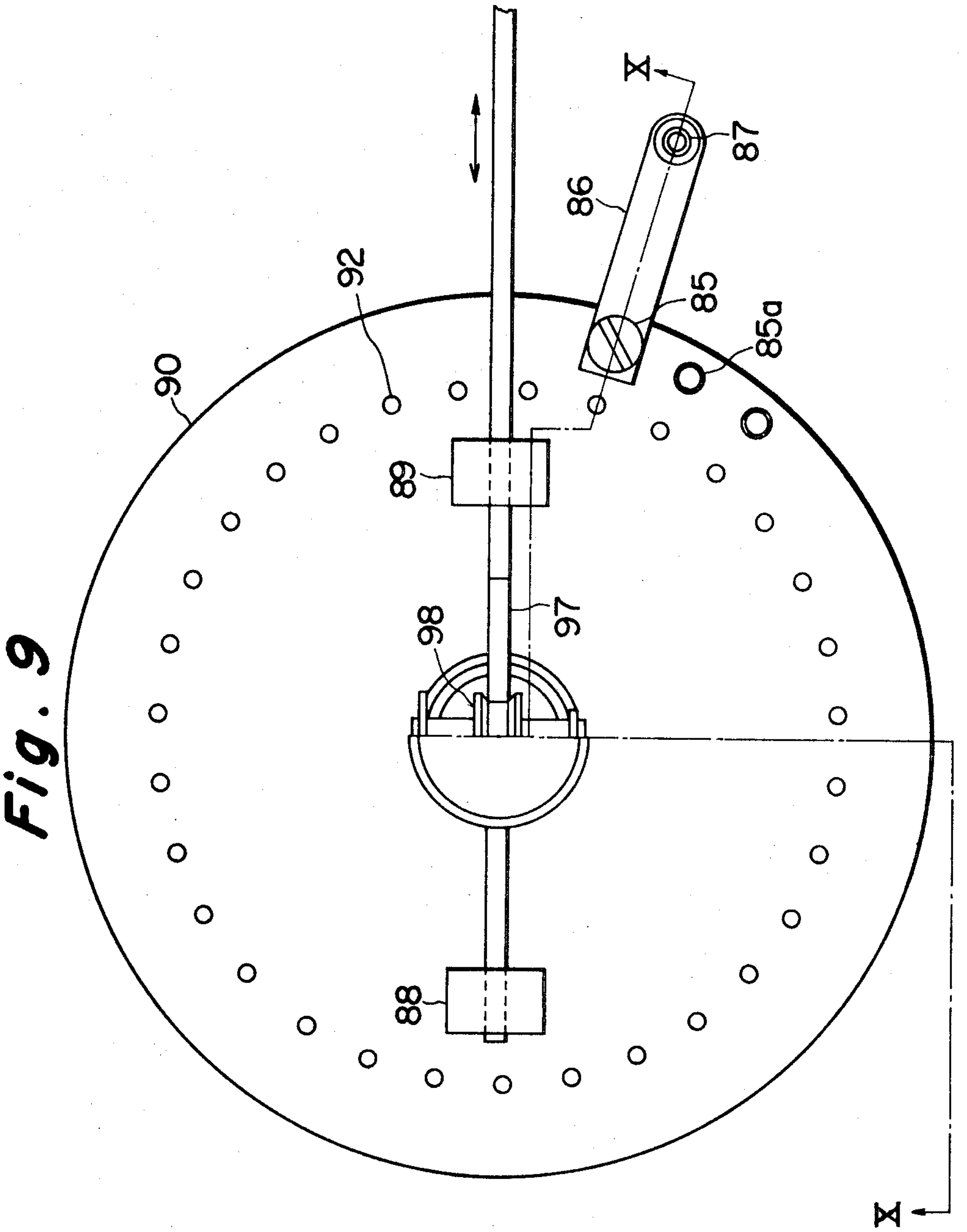
FIG. 9 is an enlarged plan view with a part cut away, showing a vertically reciprocating disk, which is incorporated in a reaction tank means for making and interrupting air supply passage to reaction tubes.
Figure 10:
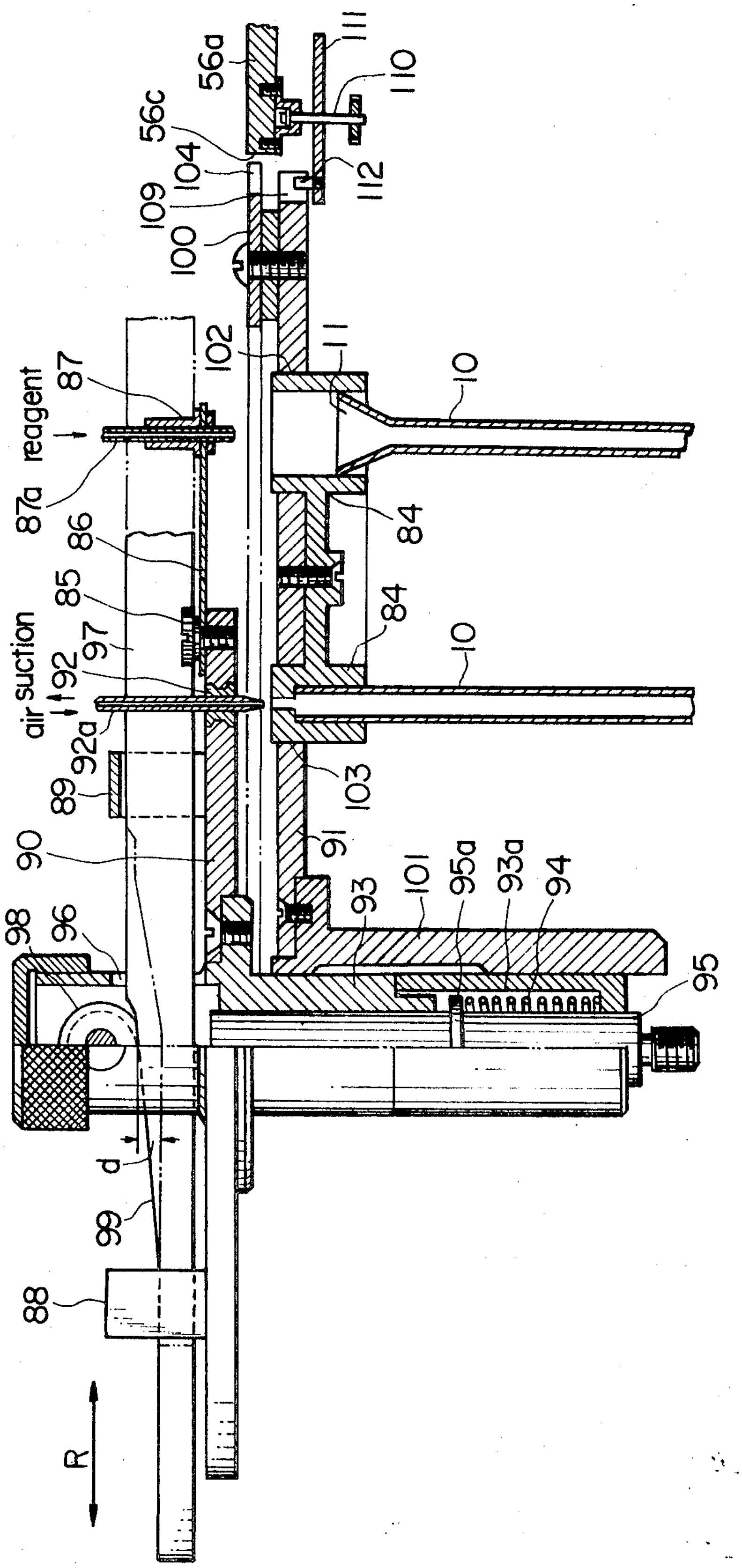
FIG. 10 is an elevation of the vertically reciprocating disk, one half of which is shown in section taken along the line X—X of FIG. 9, together with a part of a rotaty disk cooperating with the vertically reciprocating disk.
Figure 13:
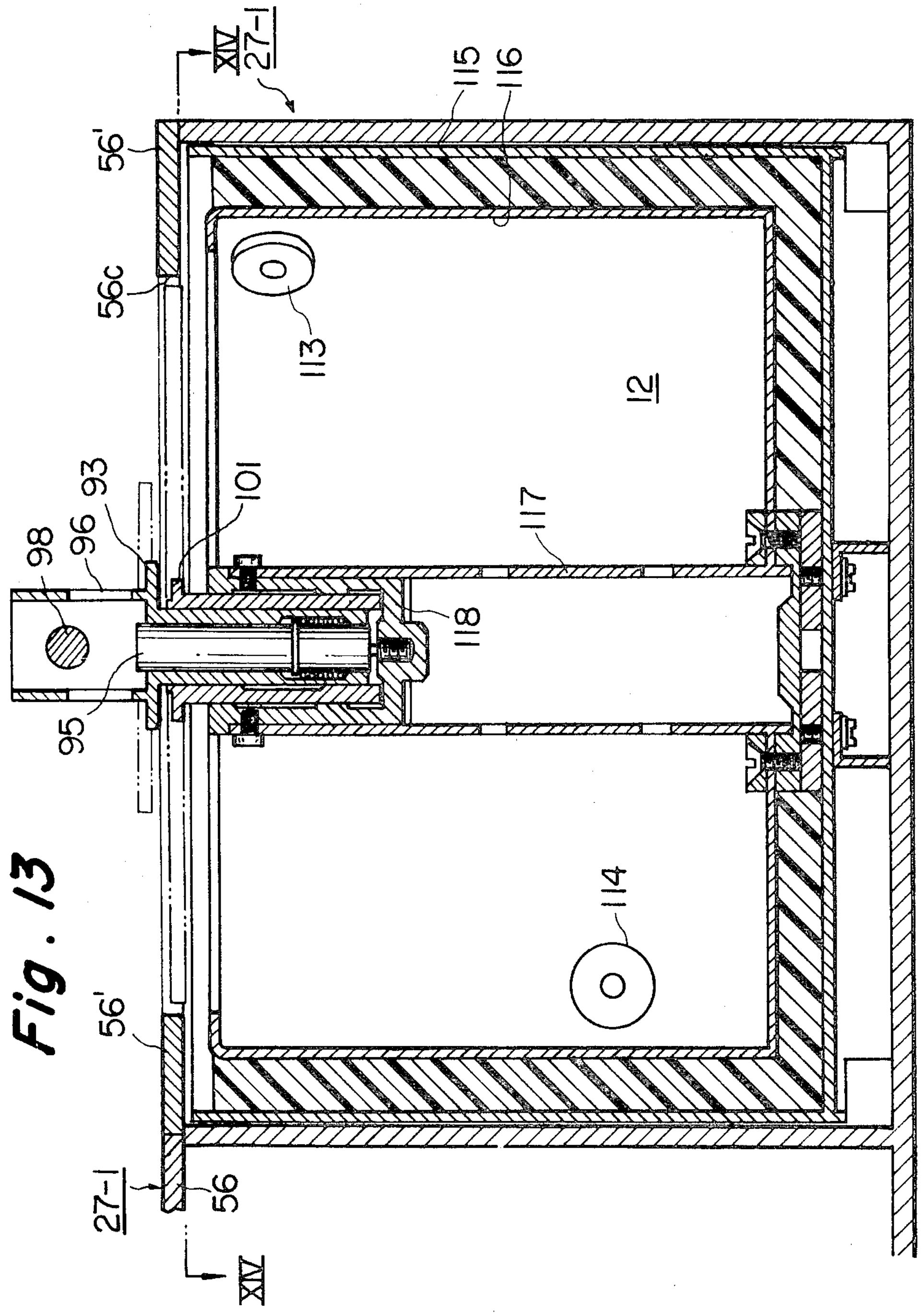
FIG. 13 is an enlarged sectional view of a thermostatic vessel of the reaction tank means for heating a test solution, consisting of a sample and a reagent, at a constant temperature.

FIG. 9 is a plan view of the vertically reciprocating disk 90 on a somewhat enlarged scale, and FIG. 10 is a sectional view of the reciprocating disk 90 taken along the line X—X of FIG. 9. FIG. 10 also shows one half of a rotary disk 91 in a section as taken along the line X—X of FIG. 11. A plurality of holes 92, e.g., thirty holes 92 in this embodiment, are bored along a circle about the center of the disk 90 with a certain radius at uniform angular intervals. An air tube **92*a* is inserted in one or more of the holes 92; so as to feed air into the U-shaped reaction tube 10 at the time of charging the tube 10 with the sample and reagents. Referring to FIG. 10, a sleeve 93 is integrally secured to the center of the vertically reciprocating disk 90 substantially at right angles to the plane of the disk 90 by a suitable means, e.g., screws. The inside diameter of the sleeve 93 is such that the sleeve 93 can rotatably be fitted on a stationary shaft 95. The shaft 95 is secured to a bearing 118 at the center of a thermostatic vessel 12, as shown in FIG. 13, so as to extend coaxially through the upper portion of the vessel 12. To this end, for instance, the lower end of the shaft 25 is threaded, while matchingly tapping the bottom of the bearing 118, and the shaft 25 is screwed into the thus tapped hole of the bearing 118. An annular recess 93***a* is formed on the inner peripheral surface of the sleeve 93, so as to receive a flange 95*a* integrally formed with the shaft 95. A coiled compression spring 94 is inserted between the flange 95*a* and the lower edge of the recess 93*a*. The compression spring 94 tends to urge the sleeve 93 downwards, relative to the stationary shaft 95. A lateral opening 96 is bored through the sleeve 93 toward the upper end thereof. The upper end of the shaft 95 terminates below the lateral opening 96 of the sleeve 93, and the sleeve 93 is axially slidable along the peripheral surface of the vertical stationary shaft 95. A horizontally reciprocating lever 97, which is guided by guide members 88 and 89 of the disk 90, extends through the lateral opening 96. The lever 97 has a tapered portion 99 toward the left end thereof, as shown in FIG. 10.

A guide roller 98 of the lever 97 is pivotally supported in the upper portion of the sleeve 93, so as to extend across the axis of the sleeve at right angles to a vertical plane passing the lever 97 and the axis of the shaft 95.

When the horizontally slidable lever 97 is forced through the lateral opening 96 of the sleeve 93 to the position as shown by solid lines in FIG. 10, the right-hand end of the sloped portion 99 of the lever 97 engages the guide roller 98 of the sleeve 93. Thereby, the lever 97 forces the sleeve 93, and accordingly the plate 90, to the raised position, against the elasticity of the spring 94. If the lever 97 moves to the right, as shown by double dot-dash lines in FIG. 10, the spring 94 acts to cause the guide roller 98 of the sleeve 93 to slide down along the tapered portion 99 of the lever 97. Since the lever 97 reciprocates horizontally due to the action of the guide members 88, 89, and 145 (FIG. 18), the aforesaid sliding of the guide roller 98 along the tapered portion 99 of the lever 97 results in a downward displacement of the guide roller 98 by a distance *d*, which corresponds to the difference of the width of the lever 97 between the widest and the narrowest parts of the tapered portion 99, as shown in the figure. Thus, in response to the rightward movement of the lever 97, the sleeve 93 moves downward by a distance *d* together with the disk 90. It is apparent that as the lever 97 moves leftwards, from the position of the double dot-dash lines to the solid line position in FIG. 10, the sleeve 93 and the disk 90 are raised by the distance *d* against the elasticity of the spring 94.

As a result of it, in response to the horizontal reciprocation of the lever 97, as shown by the arrow R of FIG. 10, the sleeve 93 reciprocates vertically relative to the shaft 95.

The driving means of the lever 97, including a motor 144, will be described hereinafter, referring to FIG. 18. Thus, due to the integral connection between the sleeve 93 and the reciprocating disk 90, the disk 90 makes vertical reciprocation in response to the horizontal reciprocation of the lever 97, which is actuated by the motor 144.

More particularly, the horizontal reciprocation of the lever 97 is so related with the operation of the sample transferring means B that when the sample is being charged into one of the U-shaped reaction tubes 10, the vertically reciprocating disk 90 is lowered and the air tube 92*a* is airtightly connected to the non-cupped end 10*a* of the reaction tube 10 being charged, as shown in FIG. 10.

In FIGS. 9 and 10, a lever 86 carrying a pipe holder 87 is connected to a preselected position of the periphery of the vertically reciprocating disk 90 by a screw 85. The pipe holder 87 holds a pipe 87*a*, which is connected to the reagent feeder 13–1 (FIG. 2) through a flexible pipe (not shown), so that a second reagent can be added into the test solution being treated in the reaction tube 10 at a certain stage of the analysis, or at a certain angular position of the circular travel of the reaction tube 10. As described in the foregoing, it is preferable to force air into the reaction tube 10 through the air tube 92*a* during the charging of the second reagent therein, so that the sample is raised to the cup 11 of the reaction tube 10 for effecting thorough mixing of the second reagent with the test solution. For such forcing of the air during the charging of the second reagent, the vertically reciprocating disk 90 can be lowered during the charging. Such vertical reciprocation, however, is not essential to the present invention, and it can be dispensed with, if so desired.

For different analyses, it is generally desirable to modify the timing of adding the second reagent, with respect to the entire process of each analytical operation. For this reason, three tapped holes 85*a* are shown in FIG. 9, so as to allow the displacement of the lever 86 with respect to the initial charging position of the sample into the reaction tube 10. The number of the tapped holes 85*a* is not limited to three, but any number of them can be provided, up to thirty in this particular embodiment, for improving the flexibility of the operation of the analyzing device.

The pipe 87*a* can also be used for removing the test solution consisting of the sample and the reagents after completion of the analysis. It is also possible to use the pipe 87*a* as a passage of rinsing water, or other rinsing liquid, for cleansing the reaction tube 10 after the analysis. If it is desired to remove the liquid from the reaction tube 10 through the pipe 87*a*, the length of the pipe 87*a* below the lever 86 should be long enough to fit the lower end of the pipe 87*a* into the cup 11 of the reaction tube 10 when the disk 90 is lowered.

Figure 11:
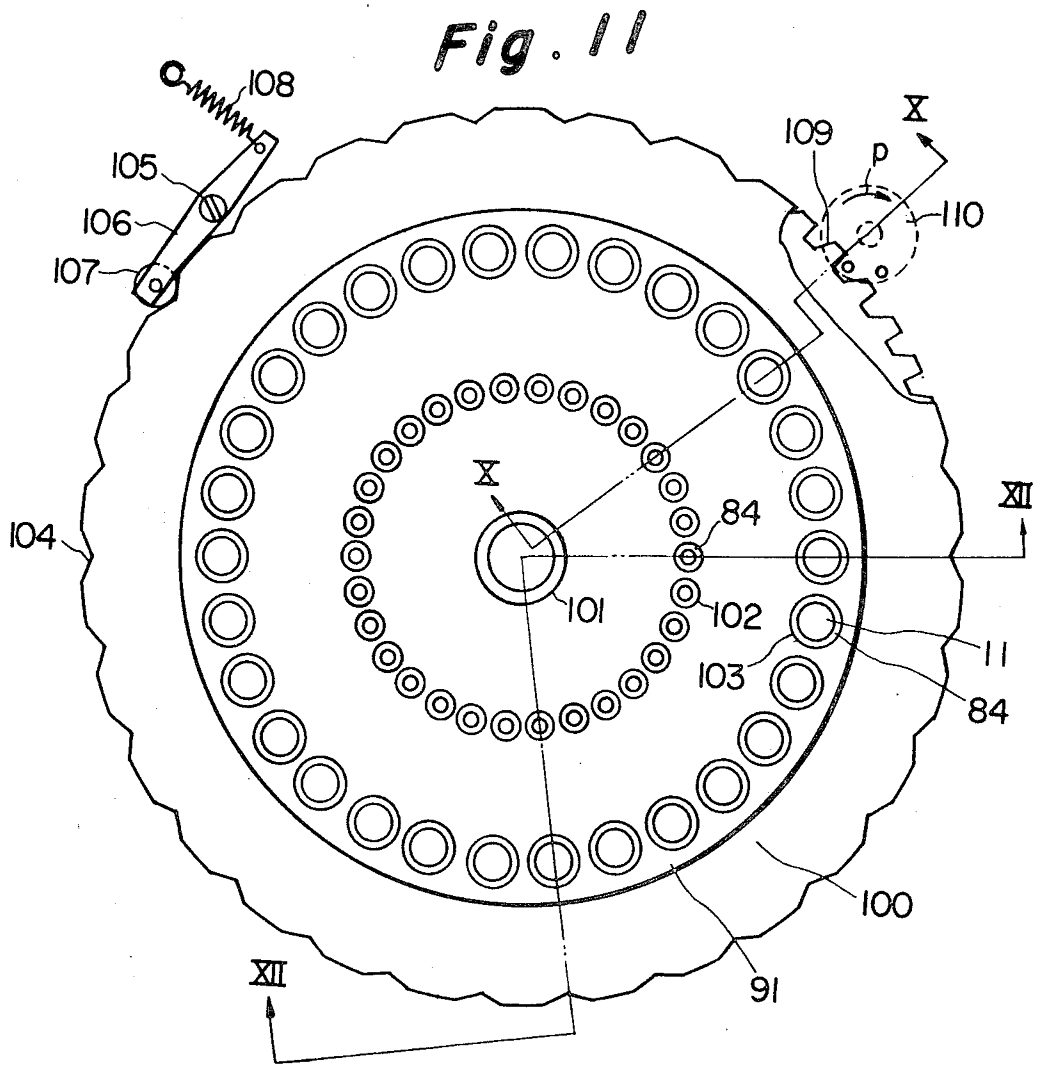
FIG. 11 is a plan view of a rotary disk of the reaction tank means for rotating reaction tubes in a thermostatic vessel, in order to stir test solutions in the reaction tubes for causing chemical reaction therein.
Figure 12:
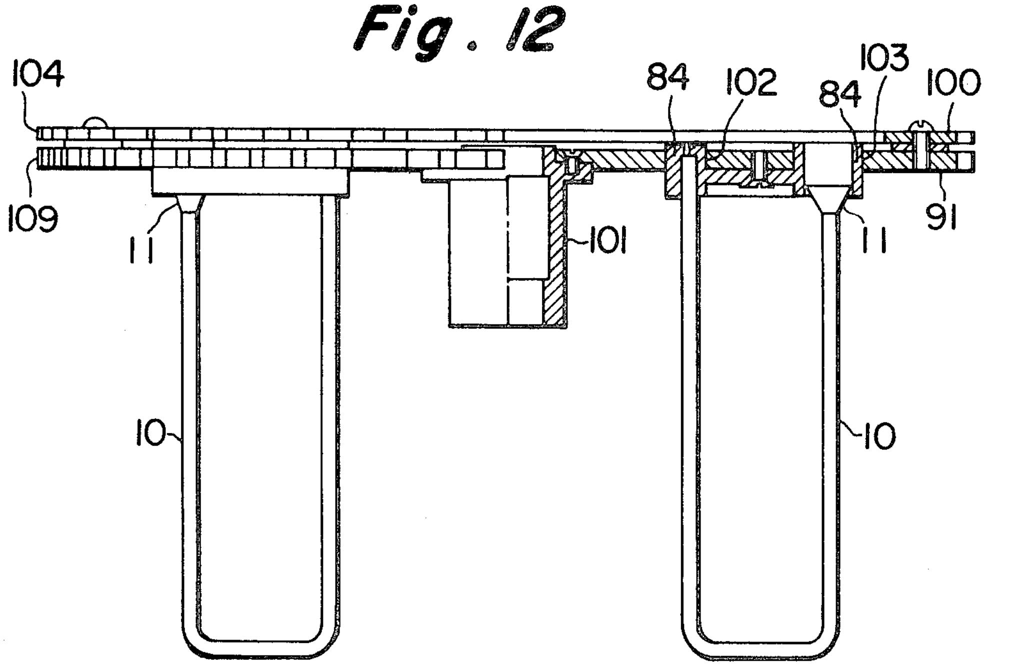
FIG. 12 is an elevation of the rotary disk, with a half thereof in section, taken along the line XII—XII of FIG. 11.

Referring to FIGS. 11 to 13, the rotary disk 91 will now be described in detail. A sleeve 101 is integrally secured to the center of a rotary disk 91, and the sleeve 101 is rotatably held by a bearing 118 which is stationary with respect to the cabinet 27–1 of the automatic analyzing device. As can best be seen from FIG. 13, the central secured to the center of a rotary disk 91, and the sleeve 101 is rotatably held by a bearing 118 which is stationary 90 with respect to the rotary disk 91. An annular indexing ring 100 with notches 104 is secured to the upper surface of the rotary disk 91 by bolts. In order to prevent an indexing roll 107 from interfering with rotating means of the rotary disk 91, it is preferable to insert a suitable spacer between the rotary disk 91 and the indexing ring 100, as shown in FIG. 12.

A series of holes 103, thirty holes in the illustrated embodiment, are bored on the rotary disk 91 along a circle about the center of the disk 91 with a certain radius. Cooperating holes 102, which are the same with the holes 103 in number, are bored on the rotary disk 91 in such manner that each hole 102 is radially aligned with the cooperating one of the holes 103, with respect to the center of the disk 91. In the illustrated embodiment, thirty holes 102 are disposed along a circle about the center of the disk 91 with a radius which is smaller than that of the locus of the holes 103.

Referring to FIG. 12, the cup 11 of the U-shaped reaction tube 10 is fitted in the hole 103, while fitting the opposite end 10*a* of the reaction tube 10 into the cooperating hole 102. A resilient gland 84 is inserted between the end portions of the U-shaped reaction tube 10 and the holes 102, 103. The gland 84 is made of rubber, or synthetic resin such as Teflon (trademark of Du Pont Co.). The upper edge of each of the glands 84 acts as a cushion when the vertically reciprocating disk 90 moves down toward the rotary disk 91. Furthermore, the upper edge of the gland 84 on the hole 102 provides airtight connection between the non-cupped end 10*a* of the U-shaped reaction tube 10 and the lower end of the air pipe 92*a*, when the vertically reciprocating disk 90 is forced to its lowermost position, as can be seen from FIG. 10. With such airtight connection, air is forced into the reaction tube 10 through the pipe 92*a* from an air source (not shown). Thus, the sample and the reagent are forced into the cup 11 and agitated by the air bubbles to become thoroughly mixed.

Top board 56' of the side cabinet 27–1 has a circular hole 56c, so that the rotary disk 91 can be fitted in the hole 56c, as shown in FIGS. 10 and 16.

A plurality of V-shaped notches 104, which are the same with the holes 103 or 102 in number, are formed on the periphery of the indexing ring 100, as shown in FIG. 11. An indexing lever 106 is pivotally supported by a pin 105 secured to the top board 56' of the cabinet 27–1, and the lever 106 is biased counter-clockwise by a spring which is inserted between the right end of the lever 106 and the top board 56', as shown in FIG. 11. The opposite end of the indexing lever 106 carries an indexing roll 107. The spring 108 acts to force the roll 107 into engagement with one of the V-shaped notches 104 of the indexing ring 100. Thus, the angular position of the rotary disk 91 about the center thereof is indexed by the forced engagement between the roll 107 and the notch 104.

To actuate the rotation of the rotary disk 91, teeth 109 are formed on the periphery of the rotary disk 91, and a driving disk 111 with two pins 112 is rotatably held by a shaft 110 on the top board 56' of the cabinet 27–1, as shown in FIGS. 10 and 11. Thereby, as the driving disk 111 is rotated by a motor (not shown) in a direction by the arrow P of FIG. 11, the two pins 112 engage one of the teeth 109 so as to turn the rotary disk 91 about he cener thereof by one pitch, e.g., 12 (360/30) degrees in the illustrated embodiment.

Figure 14:
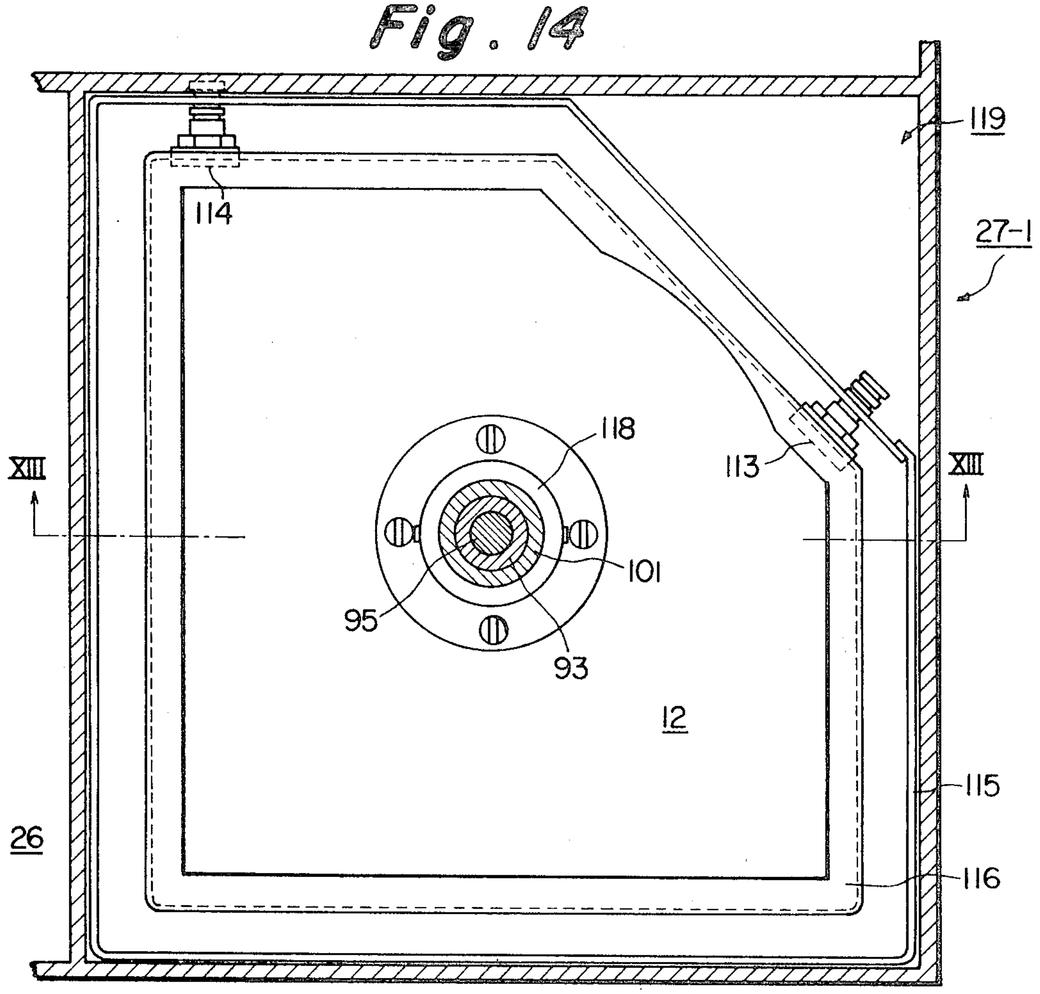
FIG. 14 is a plan view of the thermostatic vessel.

FIGS. 13 and 14 illustrate the construction of a thermostatic vessel 12, through which the reaction tubes 10 travel to carry out the prescribed chemical reactions. To ensure the thermostatic characteristics, the side and bottom walls of the vessel 12 consist of inner wall 116, an outer wall 115, and a heat insulating material filled between the two walls.

At the center of the thermostatic vessel 12, a cylinder 117 is mounted, and a bearing 118 is secured to the upper end of the cylinder 117, so as to carry the sleeves 101 and 93, as shown in FIG. 13. Referring to FIG. 14, the thermostatic vessel 12 is so shaped that a corner 119 of the side cabinet 27–1 is left for mounting driving means of the rotary disk 91 and the horizontally reciprocating lever 97 for actuating the vertically reciprocating disk 90. An inlet opening 113 and an outlet opening 114 are provided on the side wall of the vessel 12 for circulating liquid 12a (FIG. 1) of constant temperature through the vessel 12, for heating the test solution in the reaction tubes 10. It is possible to mount a heater (FIG. 21) and a thermometer (FIG. 21) in the vessel 12 for controlling and measuring the temperature of such constant temperature or heating liquid 12a.

Figure 15:
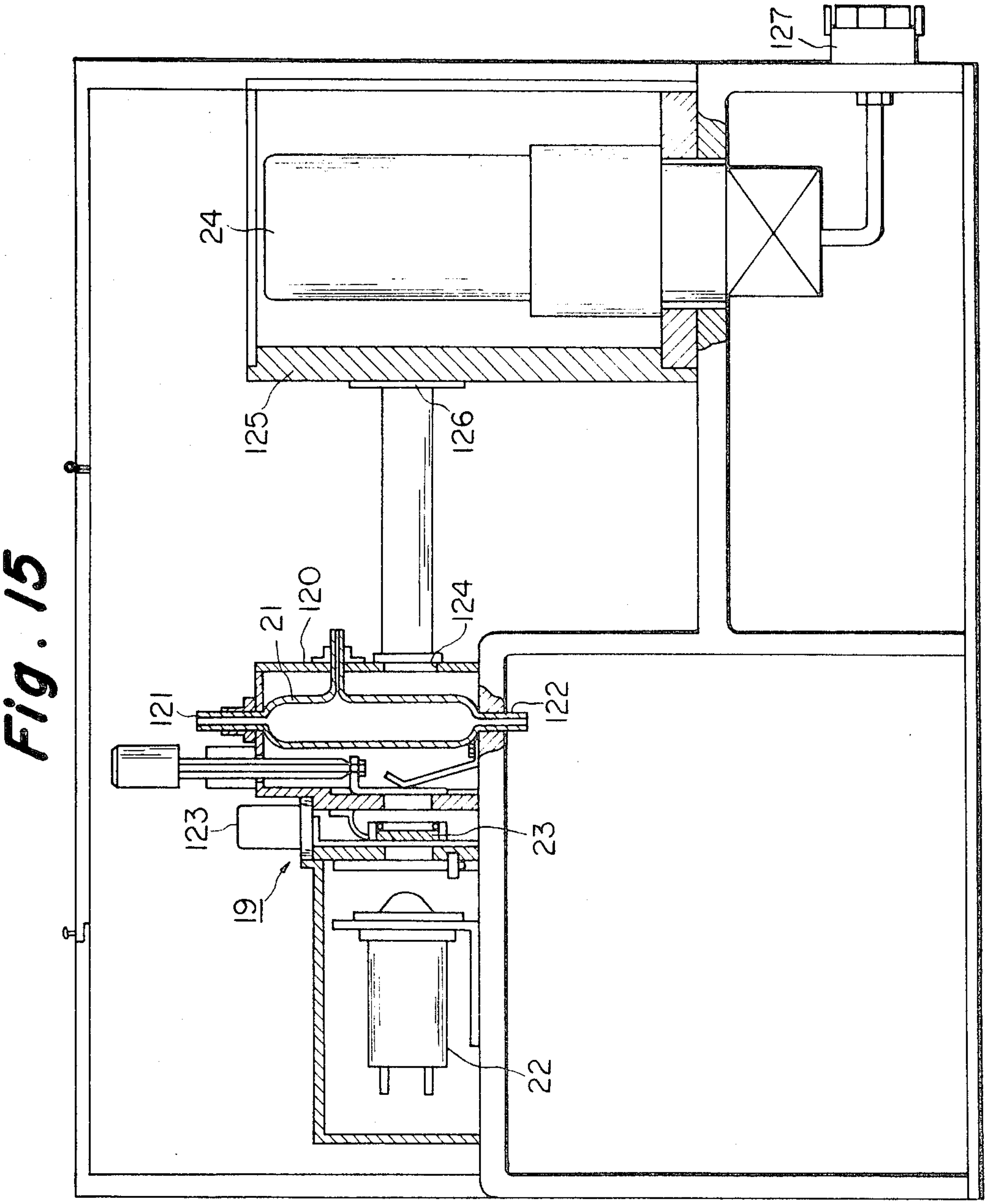
FIG. 15 is an elevation, partially in section, illustrating the construction of a colorimeter.
Figure 22:
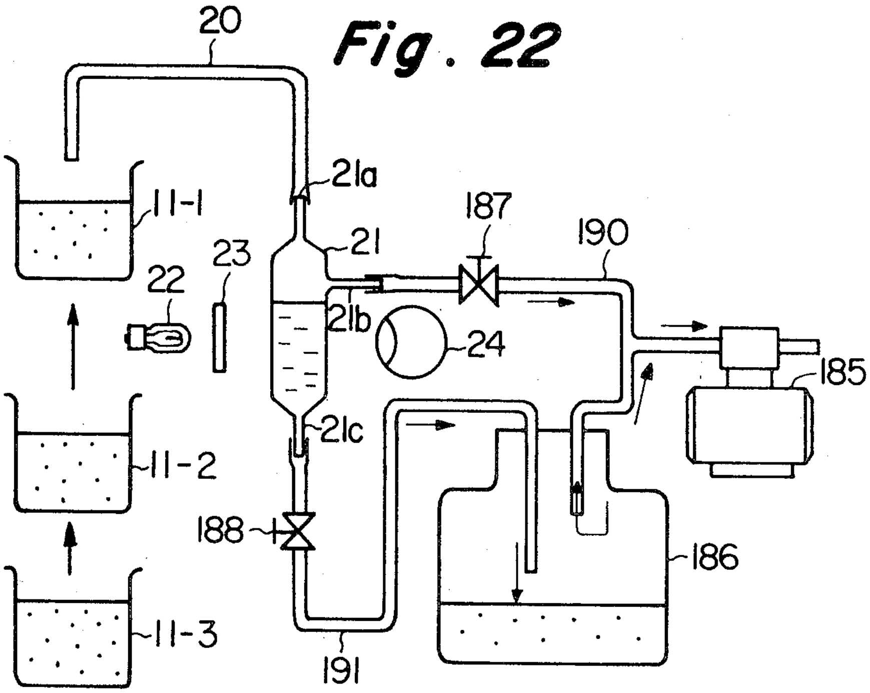
FIGS. 22 to 24 are diagrammatic illustrations of a colorimeter and a flow-cell of the colorimeter, which are usable in the device of the invention.

FIG. 15 is a diagrammatic illustration of a colorimeter 19, which can be used in the analyzing device of the present invention. A flow-cell 21 is secured to framework 120, while connecting one end 121 of the flow-cell to the piping 20 (FIG. 1) of the colorimeter. The opposite end of the flow-cell 21 is connected to a discharge means (FIG. 22). A light source lamp 22 directs light beams to the flow-cell 21 through an interference filter 23. A filter-holder 123 carrying the filter 23 is replaceably fitted in the framework 120 of the colorimeter so that different interference filters 23 can be used for different analyses, respectively. The light beams, which are generated by the lamp 22 and penetrating through the filter 23 and the sample in the flow-cell 21, are projected onto a photoelectric detector 24 through a window 124 of the framework 120. The detector 24 is disposed in a dark box 125. For this purpose, a window 126 is bored on the dark box 125. The output signals from the photoelectric detector 24 are delivered to an outside circuit (not shown), e.g., a recorder 25 of FIG. 1, through a connector 127.

FIG. 22 illustrates a piping system for automatically sucking the test solution into a flow-cell. In the figure, a flow-cell 21, made of transparent material, e.g., glass and plastics, has an inlet opening 21a, formed at the top thereof, a discharge opening 21c formed at the bottom thereof, and a suction opening 21b formed at an intermediate position between the openings 21a and 21c. The suction opening 21b communicates with a suction pump 185 through a pipe 190, which is made of flexible material and having a solenoid valve 187 for opening and closing the passage through the pipe 190. Another pipe 191 communicates the discharge opening 21c to a discharge tank 186 through another solenoid valve 188. The discharge tank is also communicated with the suction pump 185, and the gas in the tank 186 is kept at a reduced pressure.

The inlet opening 21a of the flow-cell 21 is connected to a pipe 20, which is vertically reciprocated by a suitable means (not shown), such as the lever 86 of FIGS. 9 and 10, so that the tip of the pipe 20 can be dipped into the test solution in the cup 11–1 of a reaction tube for sucking the liquid into the flow cell 21.

More particularly, upon dipping the tip of the pipe 20 into the reacted test solution in the cup 11–1, the solenoid valve 188 is closed while opening the solenoid valve 187. Thus, the suction generated by a continuously running suction pump 185 is applied to the pipe 20 through the pipe 190 and the inlet opening 21a of the flow-cell 21. Accordingly, the liquid in the cup 11–1 is smoothly sucked into the flow-cell 21 and collected there.

Upon collecting a certain predetermined amount of the test solution, the tip of the pipe 20 is raised away from the cup 11–1, so that the measurement can be taken on the test solution in the flow-cell 21 by using the light source bulb 22, the interference filter 23, and the photoelectric detector 24.

In the device of the invention, as soon as the measurement is taken, the pipe 20 and 191 can be cleansed together with the flow-cell 21. For this purpose, a cup 11–3 containing distilled water, or any other suitable washing liquid, replaces the aforesaid cup 11–1 holding the test solution. By lowering the tip of the pipe 20, and applying the suction to the pipe 20 in the same manner as described above, the distilled water can be sucked into the inside of the flow-cell and the pipe 191, so as to wash them together with the pipe 20. In this case, the solenoid valve 188 is kept open, or de-energized.

For the measurement of the succeeding test solution, a cup 11–2, holding the succeeding reacted test solution, replaces the aforesaid cup 11–3, by a suitable means (not shown), e.g., the rotary disk 91 of FIGS. 10 to 12. The suction and the measurement of the test solution in the cup 11–2 can be carried out in the same manner as described in the foregoing.

Figure 23:
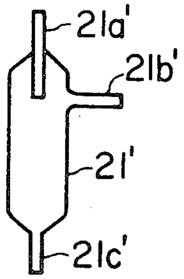

FIG. 23 illustrates a different flow-cell 21' usable in the automatic analyzing device of the invention. In this flow-cell 21', an inlet opening 21a' has a portion which extends into the inside of the flow-cell 21' while being spaced from the inner wall of the flow-cell 21' while being spaced from the inner wall of the flow-cell 21'. With the inlet opening 21a' of the aforesaid construction, the test solution can be delivered to the lower portion of the flow-cell 21' without wetting the upper inside wall of tyhe flow-cell. Thereby, contamination of the test solution with the preceding test solution, which remains on the wall of the flow-cell can be eliminated.

Figure 24:
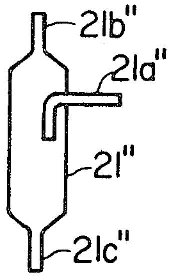

FIG. 24 shows a different flow-cell 21'' which can be used in the automatic analyzing device according to the present invention. In this flow-cell 21'', a suction opening 21b'' is disposed at the top, while the inlet opening 21a'' is disposed at the intermediate portion. In other words, the relative positions of the inlet opening 21a'' and the suction opening 21b'' in the flow-cell 21'' of FIG. 24 is reversed from that of FIG. 22 or 23. The inlet opening 21a'' includes a portion which extends into the inside of the flow-cell 21″ and bends downwards at the tip thereof. This construction of the flow-cell 21″ is advantageous in that the contamination of the succeeding sample by the preceding sample can effectively be eliminated, and that the test solution in the cell 21″ is prevented from flowing into the suction pump 185.

Thus with the aforesaid construction of the flow-cell and piping, the reacted test solution can be delivered into the flow-cell in an automatic and easily adjustable manner. Furthermore, the flow-cell and the piping can be washed after analysis of each test solution. In addition, the risk of reverse flow of the test solution or the flow of the test solution into the suction pump can completely be eliminated.

For satisfactory colorimetry of each test solution, a certain length of light path is necessary through the test solution. For instance, about ten centimeters of light path is usually required for valid colorimetry. If a proper light path length is to be provided while allowing the test solution to flow, the quantity of the test solution to be sucked by the flow-cell 21 must be large. On the other hand, if the test solution is kept stationary during the colorimetry, the amount of the test solution can be reduced, but the flow-cell 21 must so be shaped as to provide the required light path length, which may sometimes necessitate special valving arrangement. In the embodiment, as illustrated in FIG. 22, the flow-cell 21 includes an enlarged portion with a sufficiently large diameter for the accurate colorimetry. The use of the enlarged portion in the flow-cell 21 necessitates a curved or discontinuous connection of the enlarged portion with the suction pipe 20 having a comparatively small diameter for the economy of the test solution. The change in the diameter at the connection between the flow-cell 21 and the suction pipe 20 tends to cause a flow turbulence of the test solution, which may lead to the contamination of one test solution by a preceding test solution.

Figure 29:
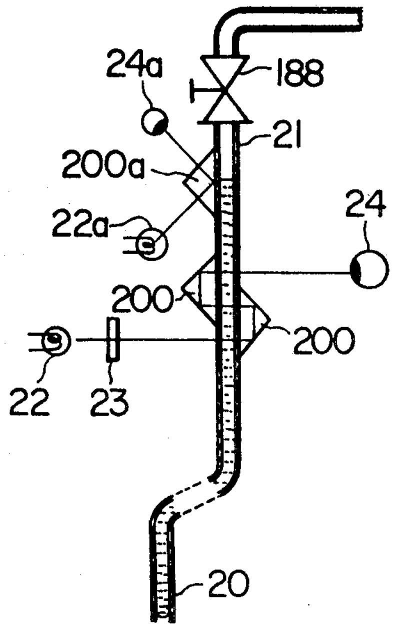
FIG. 29 is a schematic view illustrating another flow-cell, usable in the device of the invention.

In order to mitigate such difficulty, another embodiment of the invention, as depicted in FIG. 29, uses a substantially straight flow-cell 21 with a uniform diameter, in conjunction with a pair of optical prisms 200. The idea of this embodiment is to achieve the necessary light path length by causing the light beams from a light source 22 to pass across the test solution several times, e.g., three times in the illustrated embodiment. More particularly, the light beams emanate from the light source 22, and pass through an interference filter 23, the test solution for the first time, a first prism 200 for being deflected twice by reflection by 90 degrees each, the test solution for the second time, the second prism 200 for being deflected twice by reflection by 90 degrees each, and the test solution for the third time, and then become incident to a photo-detector 24. With the construction of FIG. 29, the diameter of the flow-cell 21 can be reduced to about one third of the minimum light path length required for the accurate colorimetry. Thus, the entire flow-cell 21 can be made at a uniform diameter, resulting in the complete elimination of the risk of causing turbulence of test solution caused by the change of the diameter.

Two prisms 200 are used in the embodiment, as illustrated in FIG. 29, but the number of the prisms for deflecting the light beams for causing the light beams to reciprocate across the flow-cell can be increased or reduced, so as to provide for the best arrangement for each specific application.

The test solution can be fed into and discharged from the flow-cell 21 of FIG. 29, substantially in the same manner as that of FIG. 22. In response to the delivery of a certain amount of the test solution in the flow-cell 21 for the measurement, a discharge valve 188 may be automatically closed by detecting the level of the test solution in the flow-cell 21 by a suitable means, such as a combination of a second light source **22*a* and a second light-detecting means 24*a***.

Figure 17:
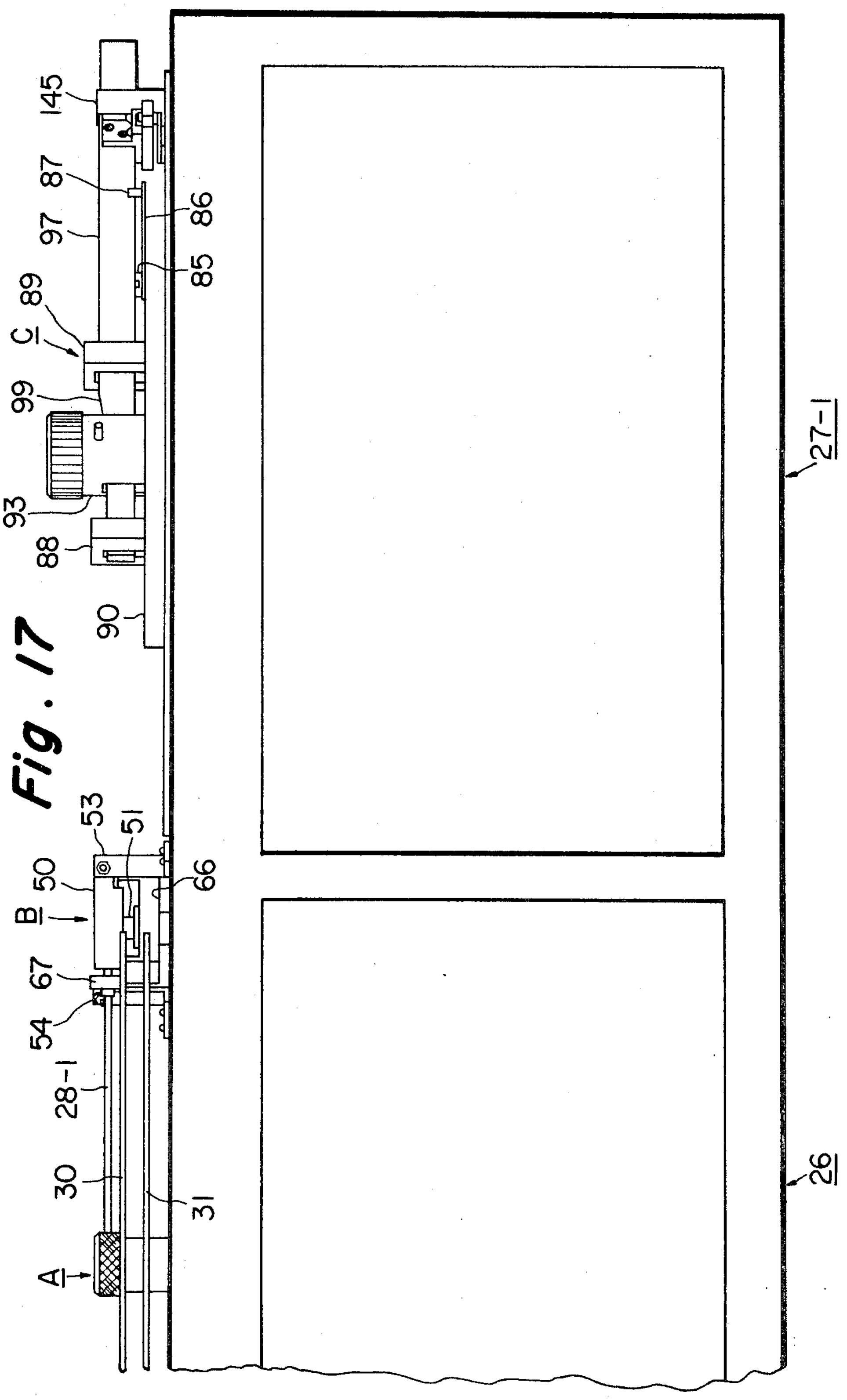
FIG. 17 is an elevation of the reaction tank means and the sample desk.

FIGS. 16 and 17 are a plan view and an elevation of the right front half of the analyzing device, on an enlarged scale. The central cabinet 26 holds motors and cams for actuating the sample turret 2 and the sample transferring means B, as well as cams and gears for effecting the proper sequential actuation of the turret 2, the arms 28–1 and 28–2, the vertically reciprocating disk 90, the rotary disk 91, the colorimeter 19, and others. To assemble the reaction tank means C, the thermostatic vessel 12 is mounted in the side cabinet 27–1, the stationary shaft 95 is secured to the bearing 118, and the central sleeves 93 and 101 of the rotary disk 91 and the vertically reciprocating disk 90 are fitted about the shaft 95 of the bearing 118 in the thermostatic vessel 12, and then the horizontally reciprocating lever 97 is fitted into the guide means 88 and 89 of the vertically reciprocating disk 90.

Figure 18:
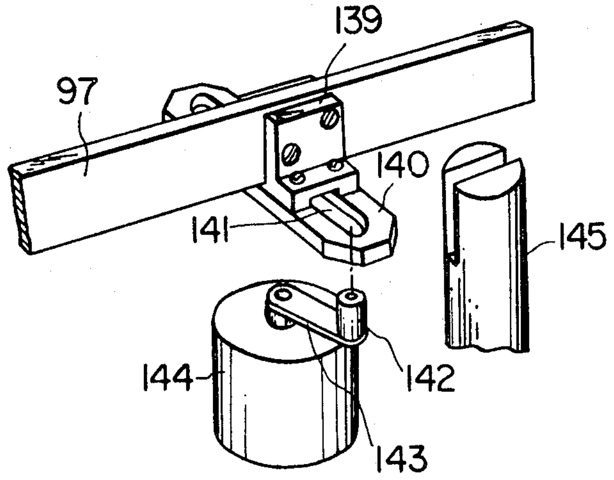
FIG. 18 is an exploded perspective view of a driving mechanism for driving an actuating lever of the vertically reciprocating disk.
Figure 19:
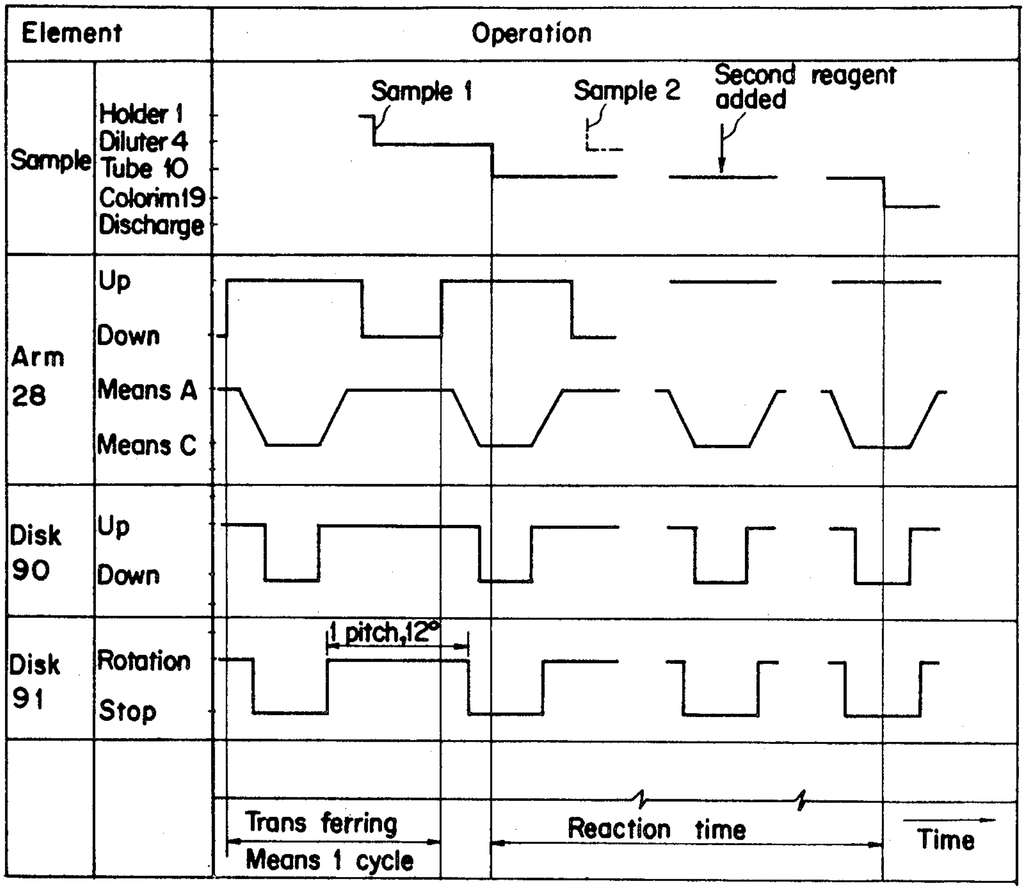
FIG. 19 is a diagram illustrating the sequence of operations of various parts of the automatic analyzing device, as shown in FIGS. 2 to 4.

FIG. 18 is an exploded perspective view, illustrating the driving mechanism of the lever 97 of the vertically reciprocating disk 90. A bifurcated guide member 145, which is secured to the side cabinet 27–1, slidably guides the movement of the reciproacting lever 97 in the longitudinal direction thereof. A slotted guide member 140 is secured to the lever 97 in the proximity of the bifurcated guide member 145, by means of L-shaped connectors 139, in such manner that a rectilinear slot 141 of the guide member 140 extends lateral to the longitudinal direction of the lever 97. A driving motor 144 rotates an arm 143, one end of which is secured to the upper end of the motor shaft. A pin 142 is rotatably secured to the opposite end thereof. The driving motor 144 is mounted on the side cabinet 27–1 in such manner that the pin 142 fits in the guide slot 141 of the guide member 140. In such assembly, as the motor 144 rotates the arm 143, the engagement between the pin 142 at the free end of the arm 143 and the guide slot 141 of the guide member 140 being integrally secured to the lever 97 causes the lever 97 to reciprocate longitudinally, under the control of guide members 145, 88, 89, and the roll 98 (FIGS. 9 and 10).

The mechanism of FIG. 18 for effecting the vertical reciprocation of the disk 90, as shown in FIG. 18, is only one example of many possible ways, and the present invention is not restricted to the mechanism of FIG. 18 alone. It would be understood that numerous modifications are possible in the mechanism for reciprocating the disk 90.

Figure 20:
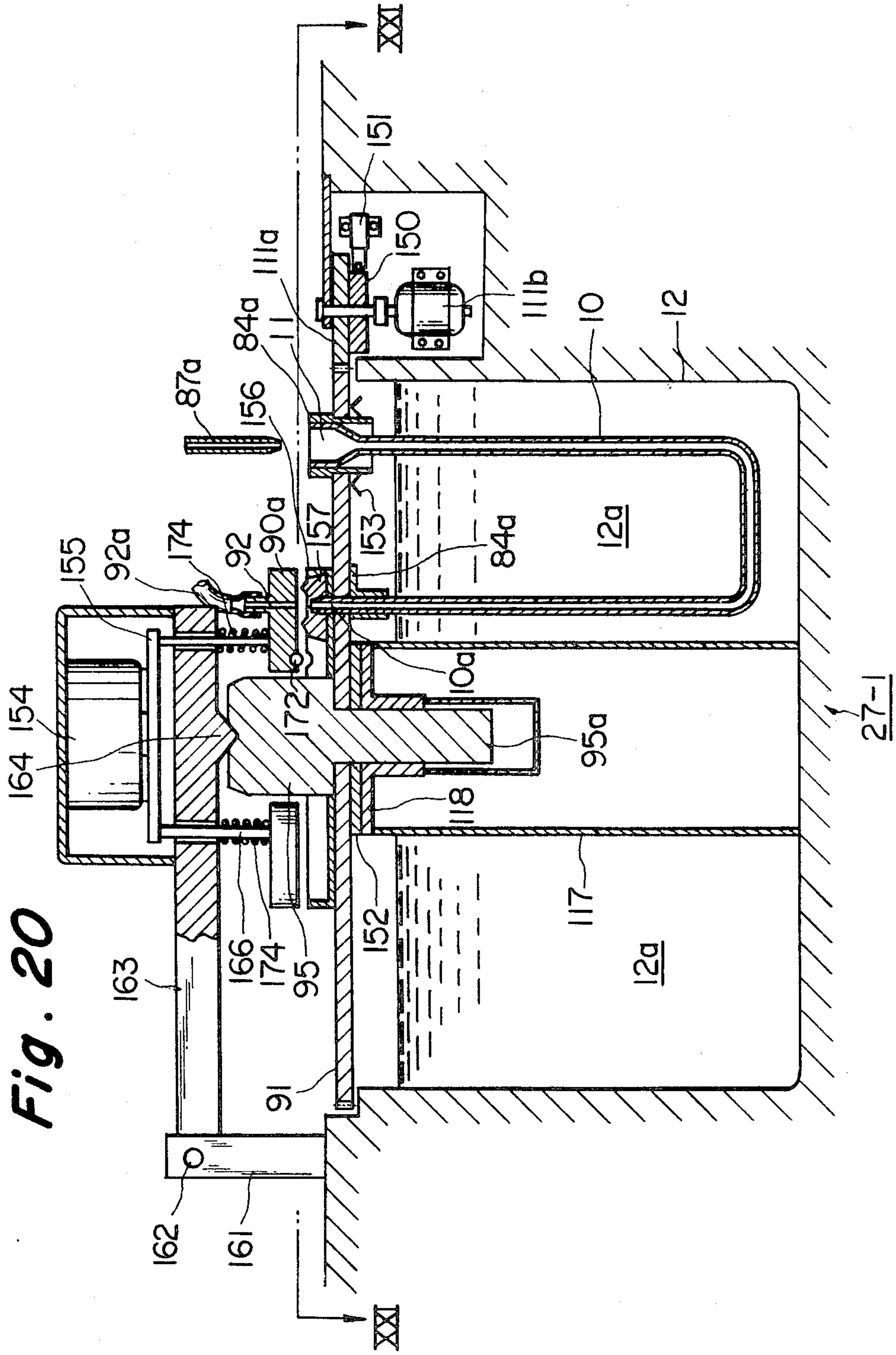
FIG. 20 is a sectional view of a different embodiment of the reaction tank means of the automatic analyzing device, according to the present invention.
Figure 21:
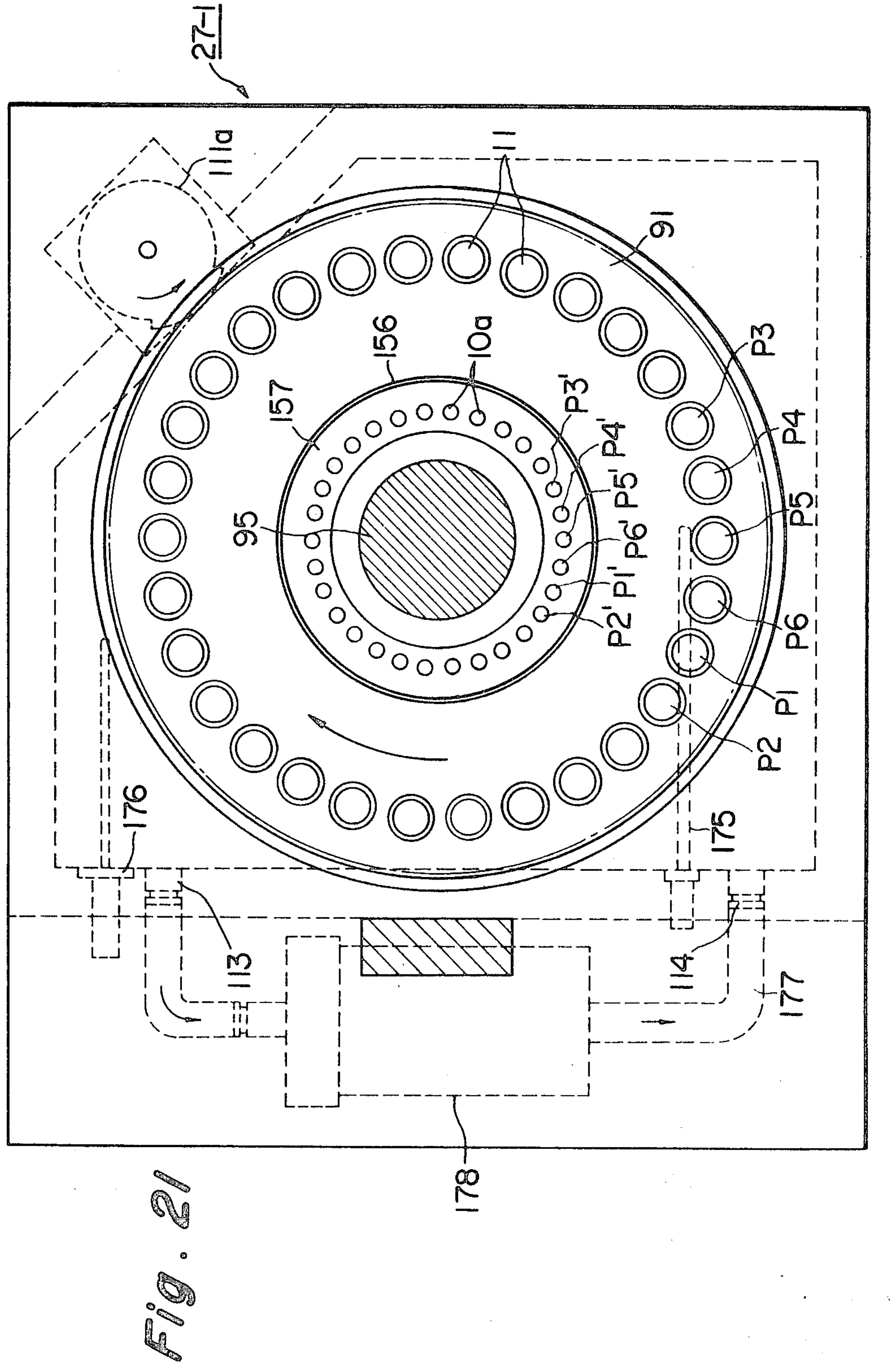
FIG. 21 is a view taken from the line XXI—XXI of FIG. 20.

In embodiment, as depicted in FIGS. 20 and 21, the vertical reciprocation of a vertically movable ring **90*a*, corresponding to the disk 90 of FIGS. 9 and 10, is effected by a magnet 154. Referring to the figures, a rotary disk 91 is pivotally supported by the central cylinder 117 of a thermostatic vessel 12. In this embodiment, a central shaft 95*a* is secured to the center of the rotary disk 91, and an oil-free bearing 118 secured to the cylinder 117 rotatably supports the shaft 95*a*. A guide ring 152 is inserted between the rotary disk 91 and the bearing 118**.

A pinon **111*a* driven by a motor 111*b* operatively engages teeth formed on th e periphery of the rotary disk 91. A cam 150 is secured to the shaft of the motor 111*b*, so as to actuate a microswitch 151 by the cam 150 in proper sequence. Thereby, the vertical movement of the ring 90*a* is synchronized with the rotation of the rotary disk 91 about the axis of the shaft 95. Such synchronism is established by actuating the electromagnet 154 in proper sequence by means of the microswitch 151**. The control circuit for achieving such operational sequence is apparent to those skilled in the art, and the control circuit will not be described in detail here.

A plurality of U-shaped reaction tubes 10, e.g., thirty reaction tubes, are secured to the rotary disk 91 by means of packings **84*a* and springs 153. Non-cupped end 10*a* of each reaction tube 10 extends through the rotary disk 91 and an indexing ring 156 secured to the disk 91. Packing 157, e.g., synthetic resin packing, fastens the end portions 10*a* of the reaction tubes 10 to the indexing ring 156. As in the case of the preceding embodiment, the reaction tubes 10 are disposed radially about the center of the rotary disk 91. At an angular position P1, P4, P5, and P6, there are provided lower ends of flexible pipes 87*a*–1, 87*a*–4, 87*a*–5, and 87*a*–6, respectively. In the figure, such nozzles are collectively designated by 87*a***.

An upright stud 161 is secured to the top board of the side cabinet 27–1 in the proximity of the thermostatic vessel 12, and an arm 163 is pivotally connected to the top of the stud 161 by means of a pin 162. The arm 163 extends above the rotary disk 91, while intersecting with the axis of the shaft **95*a*. A conical projection 164 is formed at that surface of the arm 163 which faces the axis of the shaft 95*a*. The conical projection 164 fits in the corresponding recess at the top of the shaft 95*a***, as shown in FIG. 20.

A cover 173 is secured to the free end of the arm 163 on the surface opposite to the conical projection 164. An electromagnet 154 is integrally secured to the inner surface of the cover 173. An armature 155, which is to be attracted by and released from the electromagnet 154 in response to the energization and deenergization thereof, is disposed in the cover 173 in the proximity of the electromagnet 154. Four legs 166 are connected to diagonally opposing positions of the armature 155, so as to slidably penetrate through the arm 163. The four legs 166 act to connect a ring **90*a* to the armature 155, which ring 90*a* corresponds to the vertically reciprocating disk 90 of the preceding embodiment described hereinbefore referring to FIGS. 9 and 10. In other words, the ring 90*a* moves to its raised position when the electromagnet 154 is energized, while it moves to its lowered position upon de-energization of the electromagnet 154. The ring 90*a* has a plurality of holes 92 bored therethrough at positions facing the non-cupped ends 10*a* of the reaction tubes 10. Tubes 92*a*, collectively representing 92*a*–1, 92*a*–4, 92*a*–5, and 92*a*–6, which are made of flexible material, are fitted in the holes 92, so as to feed air into the reaction tubes 10** or extract air therefrom.

Coiled springs 174 are inserted between the arm 163 and the ring **90*a* along the legs 166 so that as soon as the electromagnet 154 is de-energized, the elasticity of the coiled springs 174 acts to index the ring 90*a* relative to the ring 156 on the rotary disk 91 by means of balls 172 mounted on the ring 90*a* and cooperating recesses formed on the upper surface of the ring 156. When the rotary disk 91 is rotated by the pinion 111*a*, the cam 150 completes the circuit through the microswitch 151 for actuating the electromagnet 151, so that the ring 90*a* is raised and separaed from the rotary disk 90 during the rotation of the latter, as shown in FIG. 9. FIG. 20 shows the automatic analyzing device under the conditions when the rotary disk 91 rotates with the ring 90*a*** raised.

The magnitude of each pitch of the rotation of the rotary disk 91 and the duration of the rest period of the U-shaped reaction tubes between successive revolving movements can be controlled by adjusting the configuration of the driving pinion **111*a* and the revolving speed of the motor 111*b***, respectively.

In the plan view of FIG. 21, a heater 175 selectively heats a liquid **12*a* in the thermostatic vessel 12, so as to keep the temperature of the liquid 12*a* within a predetermined range, as measured by a thermometer 176. A circulating pump 178 forces the liquid 12*a* to circulate through a circuit including the inlet opening 113 and the outlet opening 114 of the thermostatic vessel 12, as well as the pump 178** itself.

In the embodiment of FIGS. 20 and 21, when the rotary disk 91 is at the angular position P1, as shown in FIG. 21, a pipe **87*a*–1 comes close to the cup 11 of a reaction tube 10 by using a suitable means, for instance, the lever 86 of FIGS. 9 and 10, so that sample can be poured into the reaction tube 10 at the position P1. A vertically movable pipe 87*a*–4 is disposed at the position P4, which is to transfer the reacted test solution to the succeeding process, e.g., a colorimeter 19. Similarly, another pipe 87*a*–5 is disposed at the position P5, which communicates with a source of distilled water, while a vertically movable pipe 87*a*–6 is disposed at the position P6 for sucking the distilled water out of the reaction tube 10**.

On the other hand, a flexible pipe **92*a*–1 communicating with an air source can be connected to the non-cupped end 10*a* of a reaction tube 10 at the position P1'. which is to be assumed by the non-cupped end 10*a* when the rotary disk 91 is at the angular position P1, by the vertical movement of the ring 90*a*. The air source is adapted to force air into the reaction tube 10. Similarly, pipes 92*a*–4, and 92*a*–6 are held by the ring 90*a* at angular positions P4', and P6', so as to force air into the reaction tubes at the corresponding angular positions, while a pipe 92*a*–5 at the position P5' acts to suck air out of the reaction tube 10**.

OPERATION

The operation of the automatic analyzing device of the invention will be described by referring to the embodiment of FIGS. 20 and 21, in conjunction with the flow diagram of FIG. 1. It should be understood that similar operation can be effected on any embodiment of the device according to the present invention.

In the reaction tank means C with the electromagnet 154 de-energized, if one of the cups 11 of the reaction tubes 10 comes to the position P1 of FIG. 21 and the rotary disk 91 comes to rest while being disengaged from the pinion **111*a*, the vertically reciprocating ring 90*a* comes into contact with the cooperating ring 157 of the rotary disk 91. At this moment, a sample, e.g., a serum, is poured into the cup 11 of one of the reaction tubes 10, which is at the position P1, from the sample turret 2 of the sample table A through the pipe 87*a*–1 of the sample transferring means B. By feeding air into the reaction tube 10 of the cup 11 through the pipe 92*a*–1, the sample liquid in the cup 11 is prevented from coming down into the lower U-shaped portion of the reaction tube 10. The air bubbles from the pipe 92*a*–1 act to agitate the sample liquid, so that the sample can thoroughly be mixed with the reagent successively delivered into the cup 11**.

When the motor **111*b* driving the pinion 111*a* comes to a certain predetermined angular position about the axis of the motor, the electromagnet 154 is energized to separate the vertically reciprocating ring 90*a* from the ring 157 of the rotary disk 91, and then the toothed portion of the pinion 111*a* comes into engagement with the teeth formed on the periphery of the rotary disk 91. Thereby the motor 111*b* rotates the rotary disk 91, and the cup 11 and the non-cupped end 10*a* of the reaction tube 10 move to the positions P2 and P2', respectively, where both ends of the reaction tube 10 are open to the atmosphere and the test solution, or the mixture of the sample and the reagent, moves down into the lower portion of the U-shaped reaction tube 10** by gravity.

Since the liquid **12*a* in the thermostatic vessel 12 is kept at a certain temperature by means of the heater 175 and the circulating pump 178, the sample and the reagent in the U-shaped reaction tube 10 is kept at the same constant temperature. For instance, during the period when the reaction tube 10 travels from the position P2 to the position P3, in response to the intermittent step-by-step rotation of the rotary disk 91, the reaction tube 10 holding the test solution therein is kept in the liquid 12*a*** at the constant temperature.

When the rotary disk 91 comes to rest after bringing the cup 11 to the position P4, the vertically reciprocating ring **90*a* engages the ring 157 on the rotary disk 91, so that air is forced into the reaction tube 10 through the pipe 92*a*–4. Thus, the sample liquid in the lower portion of the U-shaped reaction tube 10 is raised to the cup 11 thereof. By lowering the pipe 87*a*–4 into the test solution thus raised in the cup 11, the thus reacted test solution can be sucked or transferred to the succeeding step of the automatic analysis, e.g., the colorimeter 19**.

With the cup 11 moved to the position P5, distilled water is poured into the cup 11 through the pipe 87*a*–5, and at the same time a pipe 92*a*–5 at the position P5' engages the non-cupped end 10*a* of the reaction tube 10 and provides intermittent suction to the distilled water in the reaction tube. Thus, the distilled water moves back and forth in the reaction tube 10 to cleanse the cup 11 and the reaction tube 10.

At the position P6, air is forced into the reaction tube 10 from the pipe 92*a*–6 to move the sample liquid into the cup 11, and the pipe 87*a*–6 comes into the cup 11 for extracting the distilled water out of the reaction tube 10.

Upon completion of the cleansing, the reaction tube 10 comes to the position P1 and becomes ready for the next automatic analyzing cycle by receiving a new sample liquid into the cup 11 from the sample table A by the sample transferring means B.

With the automatic analyzing device according to the present invention, the entire analyzing operation can be carried out automatically, including the pouring of the sample liquid into the cup of the reaction tube, adding reagents into the sample liquid to produce the test solution, agitating and heating the test solution, and transferring the reacted test solution to the succeeding step. Furthermore, by modifying the position of the sucking pipe 87*a*–4 and the associating air pipe 92*a*–4, the heating or reacting time can freely be adjusted.

APPLICATIONS

Typical applications of the automatic analyzing device according to the present invention are as follows.

(1) Analysis of sugar in serum samples

A number of serum samples were analyzed by the illustrated analyzing device. Each serum sample was placed in individual sample containers 1, respectively and 0.02 ml. of the sample was sucked into the diluting means, so that the sample serum could be mixed with and diluted by 1.5 ml. of a reagent. The mixture, or the test solution, was heated in the reaction tube 10 in the thermostatic vessel at 100° C. for about 8 minutes. The sample thus treated was introduced into the flow-cell 22 of the colorimeter 19 through the pipe 20. Light beams were directed to the thus reacted test solution through an interference filter 23 with a transmitting wave length of 635 millimicrons, so that the content of sugar in the serum sample could be determined by detecting the light beams from the serum sample by the photoelectric detector 24.

With the automatic analyzing device of the invention, sixty different serum samples were automatically analyzed in one hour.

(2) Analysis of urea and nitrogen in serum samples

The content of urea and nitrogen in a serum sample was analyzed by diluting 0.02 ml. of serum sample with 1.5 ml. of a reagent, heating the diluted sample at 100° C. for 8 minutes, and directing light beams with a wave length of 530 millimicrons by means of a suitable interference filter.

This analysis was also completed in one hour on sixty different serum samples.

(3) Analysis of cholesterol in serum samples

The content of cholesterol in a serum sample was analyzed by diluting 0.02 ml. of the serum sample with 3.0 ml. of a first reagent, mixing with 1.0 ml. of a second reagent, heating the test solution thus prepared at 37° C. for 8 minutes, and directing light beams to the sample through an interference filter having a transmission wave length of 560 millimicrons.

With the automatic analyzing device according to the present invention, various kinds of other analyses can be carried out efficiently: namely, analytical measurements of protein, GOT, GPT, and alkali phosphates in serum samples; thymol turbidity test; Kunkel zinc sulfate test; bilirubin icterus test; albumin quotient test, etc.

Salient features of the automatic analyzing device according to the present invention can be summarized as follows:

(a) Automatic analysis can be made with a very small quantity of sample. In the aforesaid applications, the amount of each serum sample for one analysis was 0.02 ml.

(b) The efficiency of the heating and agitating process is high. The reaction tank means C, as shown in FIGS. 10 to 16, is such that the sample can thoroughly be agitated, and the sample temperature can be kept at any constant temperature in the range of room temperature to 150° C. Thus, the sample mixed with reagents can accurately be held at a desired temperature for a period which can exactly be controlled.

(c) The analytical process can easily be programmed. Conventional manual steps of various analytical process can be reproduced by a suitable program. More particularly, various constants can easily be selected, adjusted, and set, depending on the type of the analysis being done. Such constants include the degree of dilution, the amount of reagent being added, the reaction time, the reaction temperature, etc.

(d) The sample is free from any contamination. Different samples are held by different reaction tubes, respectively throughout the analytical process, and each reaction tube is automatically washed and rinsed upon completion of the analysis of each sample held therein. Thus, there is no risk of contamination of a certain sample with the preceding sample in the reaction tube. Furthermore, in a preferred embodiment of the invention, pipes of the sample transferring means is washed by the reagent or diluting agent after the delivery of each sample to the reaction tube, so that each sample is protected from being contaminated by the preceding sample.

(e) The accuracy and the reproducibility of the analysis are high. Since the entire analytical process is carried out automatically in such manner that high accuracy can be ensured in the amount of the sample used, the rate of dilution, and the amount of reagents being added. Various other reaction conditions, such as the reaction time and the reaction temperature, are accurately held constant. Thus, high accuracy of the analysis is ensured, while enabling high reproducibility of the analysis.

What is claimed is:

1. An automatic analyzing device of liquid samples, comprising a sample table, consisting of a sample turret intermittently rotatable about a center of the turret by a certain angle at a time, and a plurality of sample containers disposed along the periphery of the sample turret at uniform angular intervals;

at least one reaction tank means, each consisting of a thermostatic tank holding a fluid at a constant temperature, a rotary disk intermittently rotatable above the thermostatic tank about a vertical center line thereof by a certain angular displacement at a time in synchronism with the rotation of said sample turret, a plurality of U-shaped reaction tubes radially secured to the lower surface of the rotary disk at uniform angular intervals so as to move through said fluid in the thermostatic vessel in response to the rotation of said rotary disk, a first top end of each of the U-shaped reaction tubes being cupped and penetrating through the rotary disk at a point on a circle about the center of the rotary disk with a first radius, a second top end of each U-shaped reaction tube penetrating through the rotary disk at a point on a circle about the center of the rotary disk with a second radius, and a vertically reciprocating member disposed above said rotary disk so as to assume an uppermost position when said rotary disk rotates while assuming a lowermost position when said rotary disk is at rest, said vertically reciprocating member having through holes which are disposed on a circle about the vertical center line of the vessel with the same radius as said second radius, said through holes being airtightly communicated with said second top ends of said U-shaped reaction tubes, respectively, when said vertically reciprocating member assumes the lowermost position;

at least one measuring means measuring selected properties of said sample; and at least one sample transferring means consisting of a first flexible pipe means, a sucking means sucking the sample from one of said sample containers located at a certain angular position through said first pipe means and temporarily holding the sample, a reagent holder holding a reagent, a delivering means delivering the thus sucked sample and the reagent to one of said U-shaped reaction tubes located at a certain angular position through said first pipe means, a valve means selectively communicating one end of said first pipe means with said sucking means and said delivering means, a swingable arm holding the opposite end of said first pipe means so as to move said opposite end of the first pipe means between said sample container and said U-shaped reaction tube, and a second pipe means selectively communicating said measuring means with one of the U-shaped reaction tubes located at a certain position.

2. An automatic analyzing device according to claim 1, wherein the analyzing device further comprises an air source associated with a valve means communicating with selected ones of said through holes of the vertically reciprocating member, which air source selectively forces air into the U-shaped reaction tube when said mixture is delivered into the cup of the reaction tube for agitating the mixture, interrupts air supply to the U-shaped reaction tube to allow the travel of the mixture to the lower portion of the reaction tube, and forces air into the U-shaped reaction tube after keeping the mixture in the lower portion thereof so as to force the mixture into the cup of the reaction tube for facilitating the transfer of the mixture into the measuring means.

3. An automatic analyzing device according to claim 1, wherein said measuring means consists of a cylindrical flow-cell with a uniform diameter;

a first light source disposed at one side of the flow-cell;

a first light detecting means;

a plurality of prisms disposed in such a manner that a first one of the prisms receives light beams delivered from the first light source across the flow-cell and deflects the light beams twice by reflection by 90 degrees each, so as to direct the light beams thus deflected to a second one of the prisms across the flow-cell, and the succeeding prisms receive and deflect the light beams similarly, until a last one of the prisms directs the light beams to the first light-detecting means across the flow-cell;

a level-detecting means for detecting the level of test fluid in excess of a certain level, having a second light source directing light beams to the certain level of the flow-cell, and a second light-detecting means sensitive to light beams reflected by the test solution at the certain level; and a flow-control valve located at one end of the flow-cell, which valve is controlled by the level-detecting means, so that the valve is closed when the level of the test solution in the flow-cell reaches the certain level.

4. An automatic analyzing device according to claim 1, wherein the first radius of the circle formed on the rotary disk by the cupped portions of the U-shaped reaction tubes is larger than the second radius of the circle formed on the rotary disk by the second tops of the U-shaped reaction tubes.

5. An automatic analyzing device according to claim 1, wherein a pair of the reaction tank means are disposed at diametrically opposite sides of the sample turret, each reaction tank means having a certain number of U-shaped reaction tubes, while the sample turret holds sample containers which are the same in number as all the U-shaped reaction tubes carried by both of the pair of reaction tank means, and a pair of sample transferring means are provided for alternately transferring the sample solutions to the pair of reaction tank means, respectively.

6. An automatic analyzing device according to claim 1, wherein the measuring means includes a polarizer and an analyzer disposed across the sample, for detecting the degree of light polarization in the sample.

7. An automatic analyzing device according to claim 1, wherein the analyzing device further includes an additional reagent supplier, which delivers a second reaction reagent into the sample at a certain moment between the delivery of the sample into one of the U-shaped test tubes and the removal of the sample from the U-shaped reaction tube for measuring.

8. An automatic analyzing device according to claim 1, wherein the vertically reciprocating member of the reaction tank means includes a boss with a lateral through hole, and a horizontally reciprocating actuator lever extends through the lateral hole of the boss of the vertically reciprocating member, the actuator lever being so tapered that the vertically reciprocating member is vertically actuated in response to the horizontal reciprocation of the actuator lever.

9. An automatic analyzing device according to claim 1, wherein said measuring means consists of a flow-cell made of transparent material and having an inlet opening communicating with said second pipe means of the sample transferring means, a discharge opening, and a suction opening; a suction pump being communicated with said suction opening of the flow-cell through a first solenoid valve and communicated with said discharge opening through a circuit including a discharge tank and a second solenoid valve; a light source disposed at one side of said flow-cell; an optical interference filter inserted between said light source and said flow-cell so as to direct only selected wavelength light beams to liquid in said flow-cell; and a photoelectric detector disposed at the opposite side of the flow-cell to said light source so as to detect light beams from said flow-cell.

10. An automatic analyzing device according to claim 9, wherein the photoelectric detector produces an output signal which is proportionate to the light quantity delivered thereto from the light source through the sample.

11. An automatic analyzing device, comprising a sample turret having a plurality of sample containers annularly disposed along the periphery thereof, the turret intermittently rotating about the axis thereof by a certain angle at a time;

a driving disk mechanism disposed in the proximity of the sample turret and including a vertically reciprocating disk having a plurality of annularly disposed through-holes and vertically reciprocating in response to the rotation of the sample turret, and a rotary disk intermittently rotating about the axis thereof by a certain angle at a time, in response to the movement of the vertically reciprocating disk, the rotary disk having a plurality of annularly disposed first holes which airtightly communicate with the through-holes of the vertically reciprocating disk when the latter is lowered and a plurality of annularly disposed second holes, each second hole being paired with the corresponding one of the first holes;

a plurality of U-shaped reaction tubes, each having the opposing ends secured to paired ones of the first and second holes of the rotary disk, respectively, one end of each U-shaped tube being formed into a cup;
a constant-temperature tank housing the reaction tubes;
a sample-transferring mechanism sucking a sample from one of the sample containers on the sample turret and delivering the sample thus sucked into the cup of one of the U-shaped reaction tubes secured to the rotary disk, together with a testing reagent; and
an analyzing-measuring mechanism for analyzing and measuring sample solution in the U-shaped reaction tubes.

References Cited

UNITED STATES PATENTS 3,511,613 5/1970 Jones .............. 23—253X

MORRIS O. WOLK, Primary Examiner
R. E. SERWIN, Assistant Examiner

U.S. Cl. X.R.

23—253R, 230R, 292; 356—183